(12) United States Patent
Fukuchi et al.

(10) Patent No.: US 11,093,484 B2
(45) Date of Patent: Aug. 17, 2021

(54) DATA MANAGEMENT METHOD AND DATA MANAGEMENT SYSTEM

(71) Applicant: Hitachi, Ltd., Tokyo (JP)

(72) Inventors: Kaiho Fukuchi, Tokyo (JP); Jun Nemoto, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 245 days.

(21) Appl. No.: 16/395,480

(22) Filed: Apr. 26, 2019

(65) Prior Publication Data

US 2019/0361874 A1 Nov. 28, 2019

(30) Foreign Application Priority Data

May 22, 2018 (JP) .............................. JP2018-097972

(51) Int. Cl.
*G06F 16/00* (2019.01)
*G06F 16/23* (2019.01)
*G06F 16/245* (2019.01)
*G06F 16/27* (2019.01)
*H04L 29/06* (2006.01)

(52) U.S. Cl.
CPC ........ *G06F 16/2379* (2019.01); *G06F 16/245* (2019.01); *G06F 16/273* (2019.01); *H04L 67/42* (2013.01)

(58) Field of Classification Search
CPC ... G06F 16/2379; G06F 16/245; G06F 16/273
See application file for complete search history.

(56) References Cited

U.S. PATENT DOCUMENTS

| 10,554,649 B1 * | 2/2020 | Fields | H04L 9/3263 |
| 2012/0151250 A1 | 6/2012 | Saika | |
| 2018/0089683 A1 * | 3/2018 | Setty | G06Q 20/3829 |
| 2018/0181637 A1 * | 6/2018 | Freiberg | G06F 16/273 |
| 2018/0255132 A1 * | 9/2018 | Yasukawa | H04L 12/66 |
| 2018/0260212 A1 * | 9/2018 | Wisnovsky | G06F 8/71 |
| 2018/0276668 A1 * | 9/2018 | Li | G06Q 20/401 |
| 2019/0042620 A1 * | 2/2019 | Garagiola | G06F 16/2453 |
| 2019/0130114 A1 * | 5/2019 | Smith | G06Q 20/38215 |
| 2019/0287105 A1 * | 9/2019 | Fedorov | H04L 9/08 |

(Continued)

FOREIGN PATENT DOCUMENTS

JP 2013-532314 A 8/2013

*Primary Examiner* — Alexander Khong
(74) *Attorney, Agent, or Firm* — Mattingly & Malur, PC

(57) ABSTRACT

A storage unit stores first data including the processing target information and second data including processing history information obtained by processing the processing target information based on a processing request; the first data and the second data include a plurality of data associated with different transactions; servers include a first server and a plurality of second servers; the plurality of second servers synchronize and hold the first data and the second data; and the first server that has received the processing request reads the first data of a processing target from a second server, processes the processing request, stores the second data including the processing history information and the first data reflecting a processing result in an own server, and transmits the second data configured to reflect the processing in the first data of the second server to the second server.

10 Claims, 20 Drawing Sheets

(56) References Cited

U.S. PATENT DOCUMENTS

2019/0317934 A1* 10/2019 Jentzsch ............... H04L 9/0643
2019/0354518 A1* 11/2019 Zochowski ......... G06F 16/2379
2020/0021446 A1*  1/2020 Roennow ............ H04L 63/0478

* cited by examiner

FIG. 4

400 RUNNING MODE FLAG INFORMATION

| C410 ON-DEMAND DATA ACQUISITION MODE | C420 ON-DEMAND DATA ACQUISITION SOURCE | C430 COMMIT SYNCRONIZATION MODE | C440 COMMIT SYNCRONIZATION TARGET | C450 BACKGROUND ACQUISITION MODE | C460 BACKGROUND DATA ACQUISITION SOURCE |
|---|---|---|---|---|---|
| true | 192.168.100.3:5053 | false | | true | 192.168.100.3:5053<br>192.168.100.4:5053<br>203.0.113.1:5050 |

FIG. 13

1300 HELD DATA MANAGEMENT INFORMATION

| INTERFACE TYPE (C1310) | START Key (C1320) | END Key (C1330) |
|---|---|---|
| SINGLE Key QUERY | A | |
| SINGLE Key QUERY | B | |
| SINGLE Key QUERY | F | |
| RANGE Key QUERY | O | R |
| RANGE Key QUERY | V | Z |
| SINGLE Key QUERY | K | |
| ... | ... | ... |

FIG. 14

1400 ON-DEMAND DATA ACQUISITION PROGRESS MANAGEMENT INFORMATION

| ACQUIRED LATEST BLOCK NUMBER OBTAINED BY BACKGROUND ACQUISITION (C1410) | BLOCK NUMBER AT START OF ON-DEMAND DATA ACQUISITION (C1420) |
|---|---|
| 6 | 30 |

FIG. 17

| RUNNING MODE FLAG INFORMATION 1700 | | | | | |
|---|---|---|---|---|---|
| ON-DEMAND DATA ACQUISITION MODE C410 | ON-DEMAND DATA ACQUISITION SOURCE C1710 | COMMIT SYNCHRONIZATION MODE C430 | COMMIT SYNCHRONIZATION TARGET C1720 | BACKGROUND ACQUISITION MODE C450 | BACKGROUND DATA ACQUISITION SOURCE C460 |
| true | 192.168.100.3:5053 192.168.100.4:5053 203.0.113.1:5050 203.0.113.2:5050 | false | | true | 192.168.100.3:5053 192.168.100.4:5053 203.0.113.1:5050 |

DATA MANAGEMENT METHOD AND DATA MANAGEMENT SYSTEM

CLAIM OF PRIORITY

The present application claims priority from Japanese patent application JP 2018-97972 filed on May 22, 2018, the content of which is hereby incorporated by reference into this application.

BACKGROUND OF THE INVENTION

1. Field of the Invention

The present invention relates to a data management method of a blockchain system.

2. Description of the Related Art

In a blockchain system in which a plurality of servers constitute a network and each server logically holds same data, it is necessary for a new server to acquire all data on the network in advance such that the new server can be added into the blockchain network and can perform transaction processing.

However, it takes some time to complete the acquisition of all the data when a data volume of the network is large. At the time of scaling out when loads increase quickly, it is necessary to quickly add a new server that can perform the transaction processing. Therefore, it is crucial to shorten the time required by the new server to acquire data.

A method which shortens a restoration time of data in a distributed computing system is known from, for example, JP-T-2013-532314 (Patent Literature 1). Patent Literature 1 discloses a technique in which a storage system acquires corresponding data from an existing server at a timing of accessing on demand, instead of acquiring all data (all files) in advance by a new server.

However, in the technique described in Patent Literature 1, since on-demand data acquisition is performed in a file unit in a storage device, each server logically holds same data like in a blockchain system. Therefore, the technique cannot be used in a case where different data is held in the file unit.

There is a problem that, even in a case where same data is used for a blockchain system, if a plurality of servers constituting the blockchain system use different file systems, the data may be different at the file level, and therefore, the technique described in Patent Literature 1 cannot be directly applied.

In addition, when the on-demand data is acquired from the plurality of servers at the file level, the consistency of the data may be impaired because the restoration proceeds regardless of whether data commit has been completed in Patent Literature 1.

SUMMARY OF THE INVENTION

The invention is made in view of the above problems, and an object of the invention is to speed up the addition of a new server and improve the availability of the new server in a blockchain system.

The invention provides a data management method which uses a plurality of servers each having a storage unit that stores data and a processing unit that runs on a processor and processes the data, and which processes processing target information distributed and stored in the storage units of the plurality of servers in response to a transaction request received by the plurality of servers, wherein the storage unit of the server stores first data including the processing target information and second data including transaction processing history information obtained by processing the processing target information based on the transaction request, the first data and the second data include a plurality of data associated with different transactions, the plurality of servers include a first server and a plurality of second servers, the plurality of second servers synchronize and hold the first data and the second data, and the first server that has received the transaction request reads the first data related to the transaction request from the storage unit of the second server, processes the transaction request, replies a processing result to a request source of the transaction request, stores the second data including the transaction processing history information and the first data reflecting the processing result in an own server, and transmits the second data configured to reflect the processing in the first data of a second server to the second server.

According to the invention, in a blockchain system in which a plurality of servers logically hold same data, the addition of a new server capable of performing the transaction processing can be speeded up and the availability of the new server can be improved.

BRIEF DESCRIPTION OF THE DRAWINGS

FIG. 4 is a diagram showing a configuration of running mode flag information according to the first embodiment of the invention.

FIG. 13 is a diagram showing a configuration of held data management information according to the first embodiment of the invention.

FIG. 14 is a diagram showing a configuration of on-demand data acquisition progress management information according to the first embodiment of the invention.

FIG. 17 is a diagram showing a configuration of running mode flag information according to a third embodiment of the invention.

DESCRIPTION OF THE PREFERRED EMBODIMENTS

Hereinafter, embodiments of the invention will be described with reference to accompanying drawings.

First Embodiment

Figure 1:
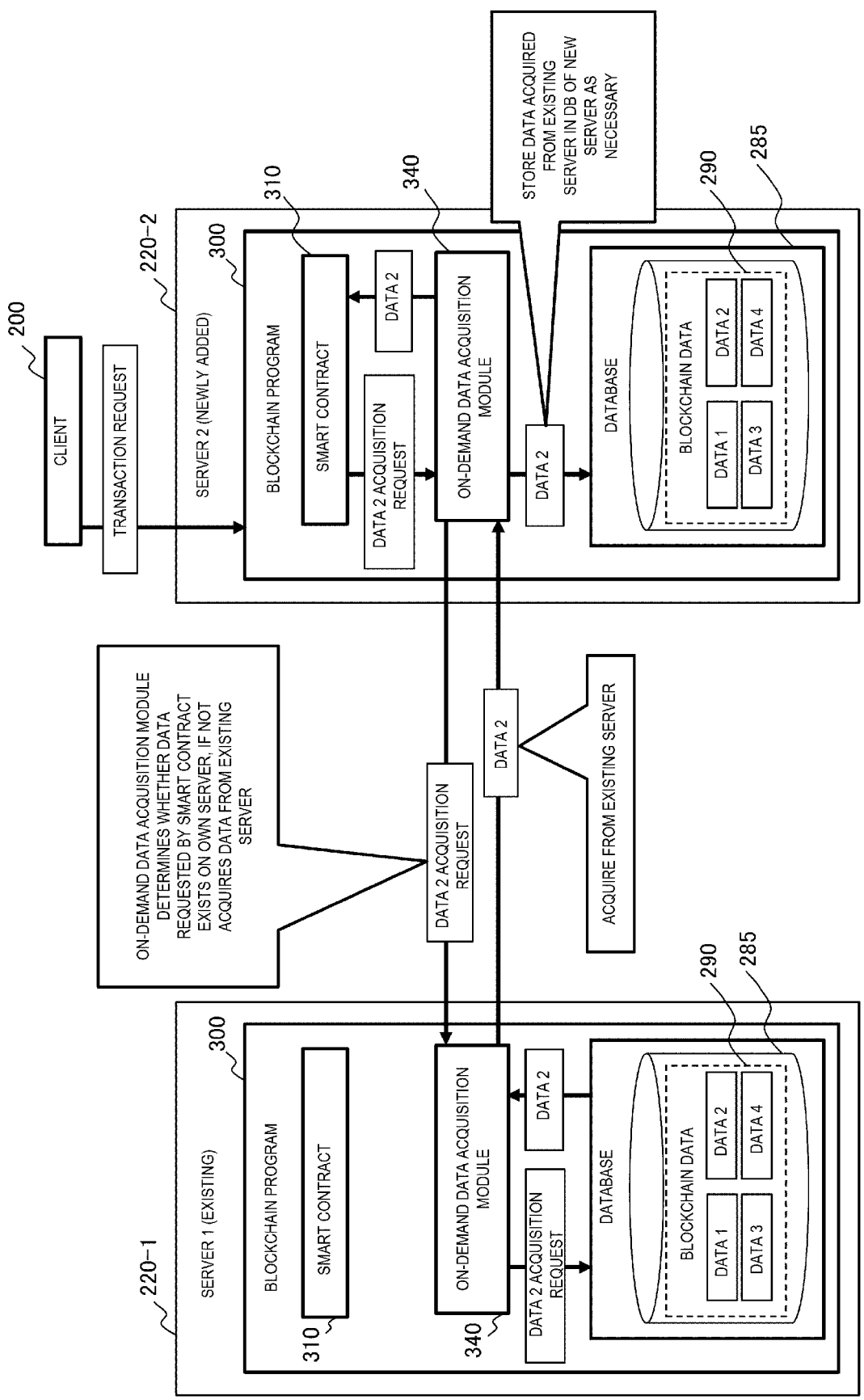
FIG. 1 is a block diagram showing an overview of a blockchain system to which the invention is applied according to a first embodiment of the invention.

FIG. 1 is a block diagram showing an overview of a blockchain system according to a first embodiment of the invention. The illustrated example shows that a new server 220-2 is added to a blockchain system constituted by an existing server 220-1 and a client 200. The server 220-1 and the server 220-2 are configured similarly, and each run a blockchain program 300. The blockchain program 300 includes a smart contract 310, an on-demand data acquisition module 340, and a database 285.

First, the client 200 issues a transaction request to the blockchain program 300 on the newly added server 220-2. Next, the blockchain program 300 on the newly added server 220-2 executes the smart contract 310, joins in the blockchain system, and executes processing (for example, contracts and information updating) requested from the client 200. The on-demand data acquisition module 340 hooks access to the database 285 from the smart contract 310.

Figure 2:
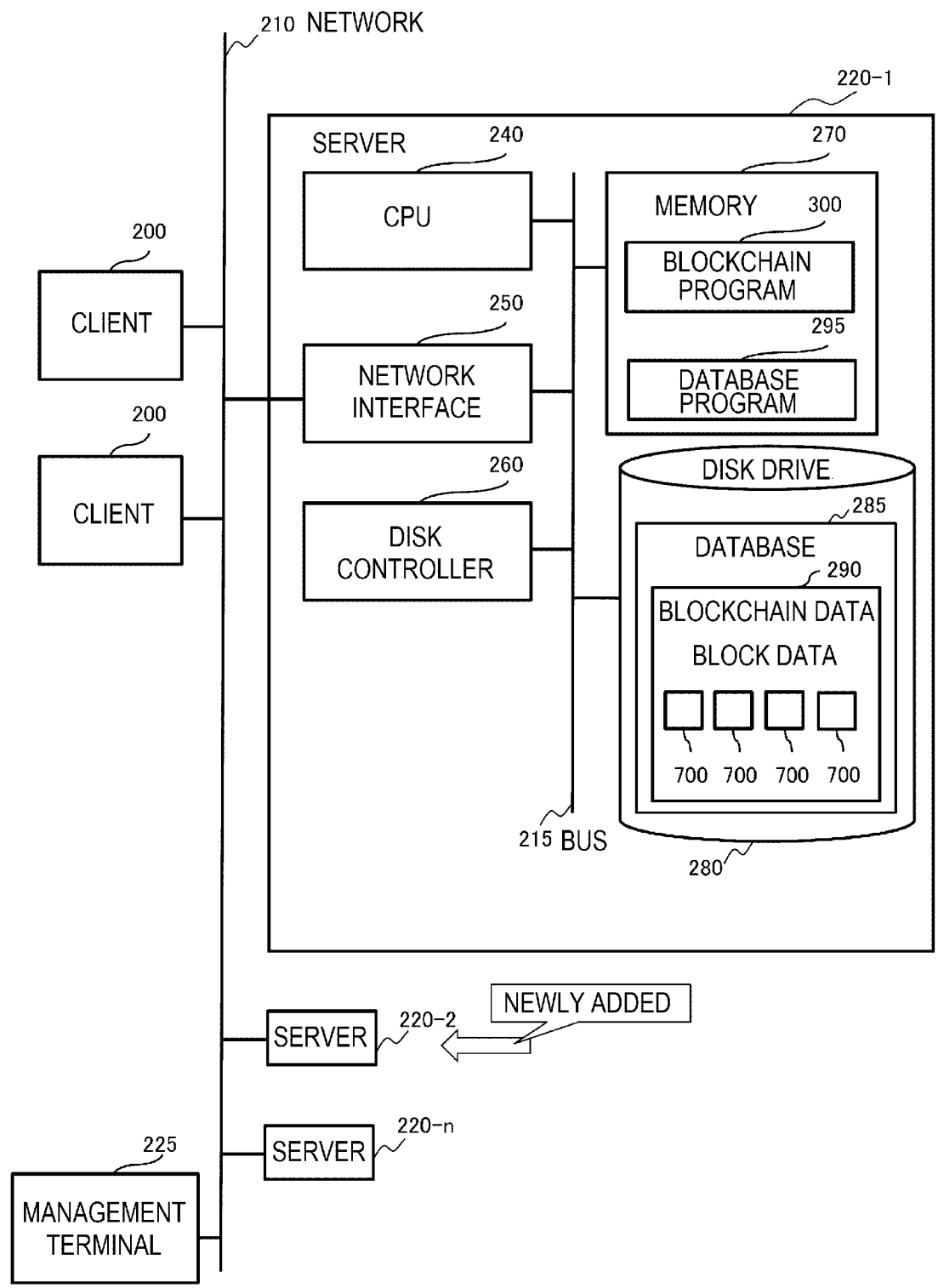
FIG. 2 is a block diagram showing an example of a configuration of the blockchain system according to the first embodiment of the invention.

FIG. 2 shows an example in which the on-demand data acquisition module 340 hooks the access to the database 285, but in the processing described below, a transaction processing module 320 hooks the access to the database 285 and causes the on-demand data acquisition module 340 to execute.

That is, the hook of access from the smart contract 310 to the database 285 may be executed by either the transaction processing module 320 or the on-demand data acquisition module 340.

For the hooked access, the on-demand data acquisition module 340 determines whether access target data (data 2 in FIG. 1) under an acquisition request exists in the own server 220-2. In a case where the data to be accessed does not exist, the on-demand data acquisition module 340 on the new server 220-2 transmits an acquisition request of the data under the acquisition request from the smart contract 310 to the on-demand data acquisition module 340 on the existing server 220-1.

Upon receiving the data acquisition request, the on-demand data acquisition module 340 on the existing server 220-1 acquires the requested data from blockchain data 290 in the database 285 and passes the data to the on-demand data acquisition module 340 on the new server 220-2 (on-demand data acquisition processing).

The on-demand data acquisition module 340 on the new server 220-2 stores the received data in the blockchain data 290 of its own database 285 as required and passes the data to the smart contract 310.

Through the above processing, the newly added server 220-2 can acquire data to be used in the smart contract 310 from the existing server 220-1 on demand via the on-demand data acquisition module 340. That is, the on-demand data acquisition module 340 of the added server 220-2 can acquire the data to be used in the smart contract 310 of the blockchain system regardless of the type of the file system and database of the existing server 220-1.

FIG. 2 is a block diagram showing a schematic configuration of the blockchain system according to the first embodiment of the invention. The blockchain system is a computer system including one or more clients 200, one or more servers 220-1 to 220-n connected to the clients 200 via a network 210, and a management terminal 225. In the following description, when the servers 220-1 to 220-n are not specified individually, a symbol "220" is used while "-" and the number behind "-" are omitted. The same also applies to the symbols of other constituent elements. The illustrated example shows that the server 220-2 is newly added.

The client 200 is a computer used to utilize a blockchain service provided by the one or more servers 220. The client 200 runs a client program for using the blockchain service. The client 200 may also be used as the server 220 by running the client program in the server 220. In addition, the client 200 may be used as the management terminal 225 by running the client program in the management terminal 225.

The network 210 is a network that connects the client 200 and the server 220 to each other. The network 210 is, for example, a wide area network (WAN), a local area network (LAN), the Internet, a storage area network (SAN), a public line, or a dedicated line.

The server 220 is a computer that provides the blockchain service to the client 200. The server 220 is a computer in which a memory 270 that stores programs and data, a CPU 240 that executes the programs stored in the memory 270, a network interface 250 used for communication with the client 200, a disk drive (storage unit) 280, and a disk controller 260 that controls inputs and outputs to the disk drive 280 are equipped and connected via an internal communication path (for example, a bus 215). It should be noted that the server 220 may be configured as a virtual machine.

Programs and data are stored in the memory 270 of the server 220. For example, the memory 270 stores the blockchain program 300 and a database program 295 that manages the database 285. The first embodiment is described on the premise that a subject that provides the blockchain service is the blockchain program 300, for example.

The blockchain program 300 cooperates with a blockchain program 300 in another server 220 to service the smart contract for the client 200 and executes the smart contract based on the transaction request received from the client 200.

The disk controller 260 inputs and outputs data of the disk drive 280, for example, in a unit of block, based on input/output requests of various programs stored in the memory 270.

The disk drive 280 is a storage device configured to store data to be read and written by various programs stored in the memory 270. In the first embodiment, the blockchain data 290 is stored in the disk drive 280. The blockchain data 290 may be stored in the database 285 in a format structured into a Key-Value format using the database program 295.

The management terminal 225 is used when an administrator of the blockchain system changes the setting of the blockchain program 300 and the like. The management terminal 225 is a computer including the same modules as in the servers 220 (the CPU 240, the network interface 250, the disk controller 260, the disk drive 280, the memory 270, and the bus 215).

The management terminal 225 executes a management program, and the administrator of the blockchain system uses the management program to change the setting of the blockchain program 300.

Figure 3:
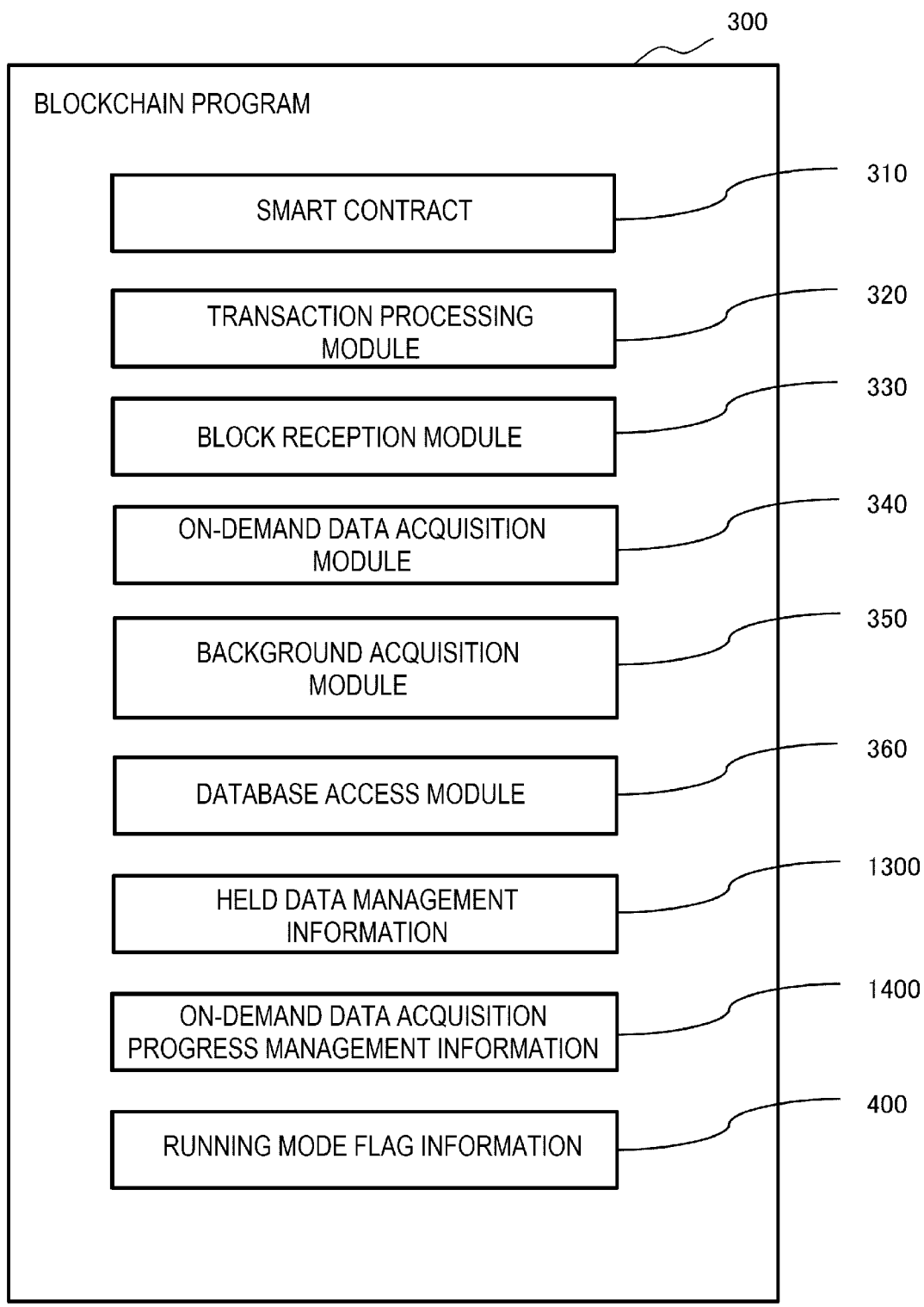
FIG. 3 is a block diagram showing an internal configuration of a blockchain program according to the first embodiment of the invention.

FIG. 3 is a block diagram showing a functional configuration of the blockchain program 300. The blockchain program 300 includes a smart contract (smart contract processing unit) 310, a transaction processing module 320, a block reception module 330, an on-demand data acquisition module (on-demand data acquisition unit) 340, a background acquisition module 350, a database access module 360, held data management information 1300, on-demand data acquisition progress management information 370, and running mode flag information 400.

The smart contract 310 is executed by the CPU 240 of the server 220. The smart contract 310 is, for example, a program configured to process transactions of financial assets such as virtual currency and securities. There may be a plurality of types of smart contracts 310.

The transaction processing module 320 is executed by the CPU 240 of the server 220 in response to a transaction request from the client 200. The transaction processing module 320 receives the transaction request from the client 200 and executes the corresponding smart contract 310 based on the transaction request content. Further, the transaction processing module 320 distributes execution results to the server 220 and returns the transaction processing results to the client 200 after the determination.

The block reception module 330 receives block data transmitted by the transaction processing module 320 of another server 220 and commits the block data and the execution results of the transaction included in the block data to the database. As a result, the blockchain data 290 is updated.

The on-demand data acquisition module 340 is executed by the CPU 240 of the server 220 in response to the database access of the smart contract 310. The on-demand data acquisition module 340 determines whether the own server 220 holds data (Key/Value) required by the smart contract 310, transmits a data acquisition request to the on-demand data acquisition module 340 on the existing server 220-1 in a case where the data is not held, and acquires the required data from the existing server 220-1.

The background acquisition module 350 executes background acquisition processing (S1100 in FIG. 11) at a predetermined cycle using a timer and the like. The background acquisition module 350 acquires block data that is not held by the server 220 itself from another server 220. The acquisition of the block data in the background may or may not be executed.

By executing the acquisition of the block data in the background, the new server 220-2 can ultimately hold all the same data as the existing server 220-1. This is because block data 700 stores the history of the processing on the blockchain data, and thus it is possible to create previous blockchain data by using the block data. On the other hand, this acquisition may not be executed in a case where all data is not required.

Whether executing the background acquisition processing (the background acquisition mode C450 in the running mode flag information 400) and an interval of the timer can be set by the blockchain system administrator using the management terminal 225.

The database access module 360 is utilized when the smart contract 310 reads and writes data from and to the database 285. The database access module 360 provides a unified interface for the smart contract 310 to access the database. Therefore, the smart contract 310 can access the database 285 regardless of the difference in the type of the database and the like.

The held data management information 1300 is a table for managing that which Key has been acquired by the on-demand data acquisition. When the on-demand data acquisition processing is executed, the table is updated by the on-demand data acquisition module 340.

On-demand data acquisition progress management information 1400 is stored in the memory 270 or the disk drive 280. The on-demand data acquisition progress management information 1400 are used to manage block numbers of latest block data at the start of the on-demand data acquisition and whether the background acquisition module 350 has acquired the block data until which number. The on-demand data acquisition progress management information 1400 is used to determine the end of the background acquisition processing (step S1150 in FIG. 11) of the background acquisition module 350.

Functional units including the smart contract 310, the transaction processing module 320, the block reception module 330, the on-demand data acquisition module 340, the background acquisition module 350, and the database access module 360 are loaded into the memory 270 as elements of the blockchain program 300.

The CPU 240 runs as a functional unit that provides a predetermined function by processing according to a program of the function unit. For example, the CPU 240 functions as the transaction processing module 320 by processing according to a transaction processing program. The same applies to other programs. Further, the CPU 240 also runs as functional units that provide respective functions of a plurality of processing executed by respective programs. The computer and computer system are a device and system that include these functional units.

The programs for realizing each function of a control unit 110 and information such as tables can be stored in a storage device such as the disk drive 280, a nonvolatile semiconductor memory, and a solid state drive (SSD); or in a computer-readable non-transitory data storage medium such as an IC card, an SD card, or a DVD.

FIG. 4 is a diagram showing a configuration of the running mode flag information 400. The running mode flag information 400 stores information about whether to execute the on-demand data acquisition, an acquisition source of the on-demand data, whether to execute a commit synchronization, whether to execute the background acquisition, and an acquisition source of the background acquisition.

The running mode flag information 400 is stored in the memory 270 or the disk drive 280. The running mode flag information 400 includes an on-demand data acquisition mode C410, an on-demand data acquisition source C420, a commit synchronization mode C430, a commit synchronization target C440, a background acquisition mode C450, and a background data acquisition source C460.

The on-demand data acquisition mode C410 indicates whether the on-demand data acquisition module 340 should execute the on-demand data acquisition processing, and the blockchain system administrator uses the management terminal 225 to change values. In the on-demand data acquisition mode C410, "true" is set when the on-demand data acquisition processing should be executed, and "false" is set when the on-demand data acquisition processing should not be executed.

The on-demand data acquisition source C420 is information indicating from which server 220 the on-demand data acquisition module 340 acquires the on-demand data. The first embodiment specifies an example in which a computer acquires data by a combination of an IP address and a port number of the server 220.

The on-demand data acquisition module 340 uses the on-demand data acquisition mode C410 and the on-demand data acquisition source C420 to determine whether the on-demand data acquisition processing is executed, and specifies the on-demand data acquisition source.

The commit synchronization mode C430 specifies whether the blockchain program 300 synchronously transmits the block data to another server 220 when the block data is committed. When the block data is transmitted synchronously, "true" is set, and "false" is set when the block data is not transmitted.

The commit synchronization target C440 specifies to which server 220 the block data is synchronously transmitted when the block data is committed by the blockchain program 300. The first embodiment specifies a computer that transmits the block data by the combination of the IP address and the port number of the server 220.

The background acquisition mode C450 specifies whether the background acquisition module 350 executes the background acquisition processing. When the background acquisition processing is executed, "true" is set, and "false" is set when the background acquisition processing is not executed.

The background data acquisition source C460 specifies from which server 220 the background acquisition module 350 acquires the block data. The background data acquisition source C460 stores the IP address and the port number of the server 220 from which the block data is acquired.

Figure 5:
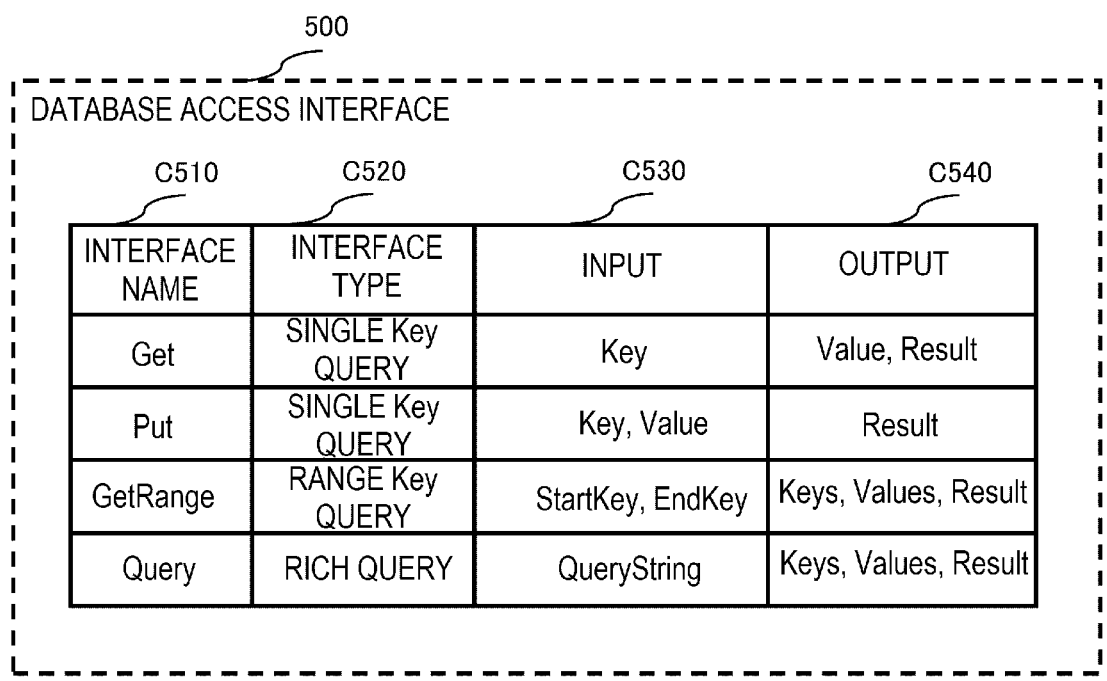
FIG. 5 is a diagram showing an example of a database access interface according to the first embodiment of the invention.

FIG. 5 is a diagram showing an example of a database access interface 500. The database access interface 500 is managed by the database access module 360 and is used when the smart contract 310 accesses the database 285. The smart contract 310 uses the database access interface 500 to input and output data to and from the database 285.

An interface name C510 includes names of each interface. An interface type C520 classifies the interfaces according to what kind of input is received by each interface, and for example, a "single-Key query" is set when only a single Key is input, and a "range Key query" is set when two Keys respectively indicating a start point and an endpoint are input, and a "rich query" is set when any character string such as a regular expression is input.

The type of a value to be received as the input by each interface is set in input C530. For example, an interface name C510="Get" receives a single Key as the input. In addition, "Value", "Startkey", "Endkey", "QueryString" and the like are set.

An output C540 includes output contents of each interface. For example, an interface name C510="GetRange" outputs a plurality of Keys, a plurality of Values, and a Result indicating whether the processing result is a success or failure.

Figure 6:
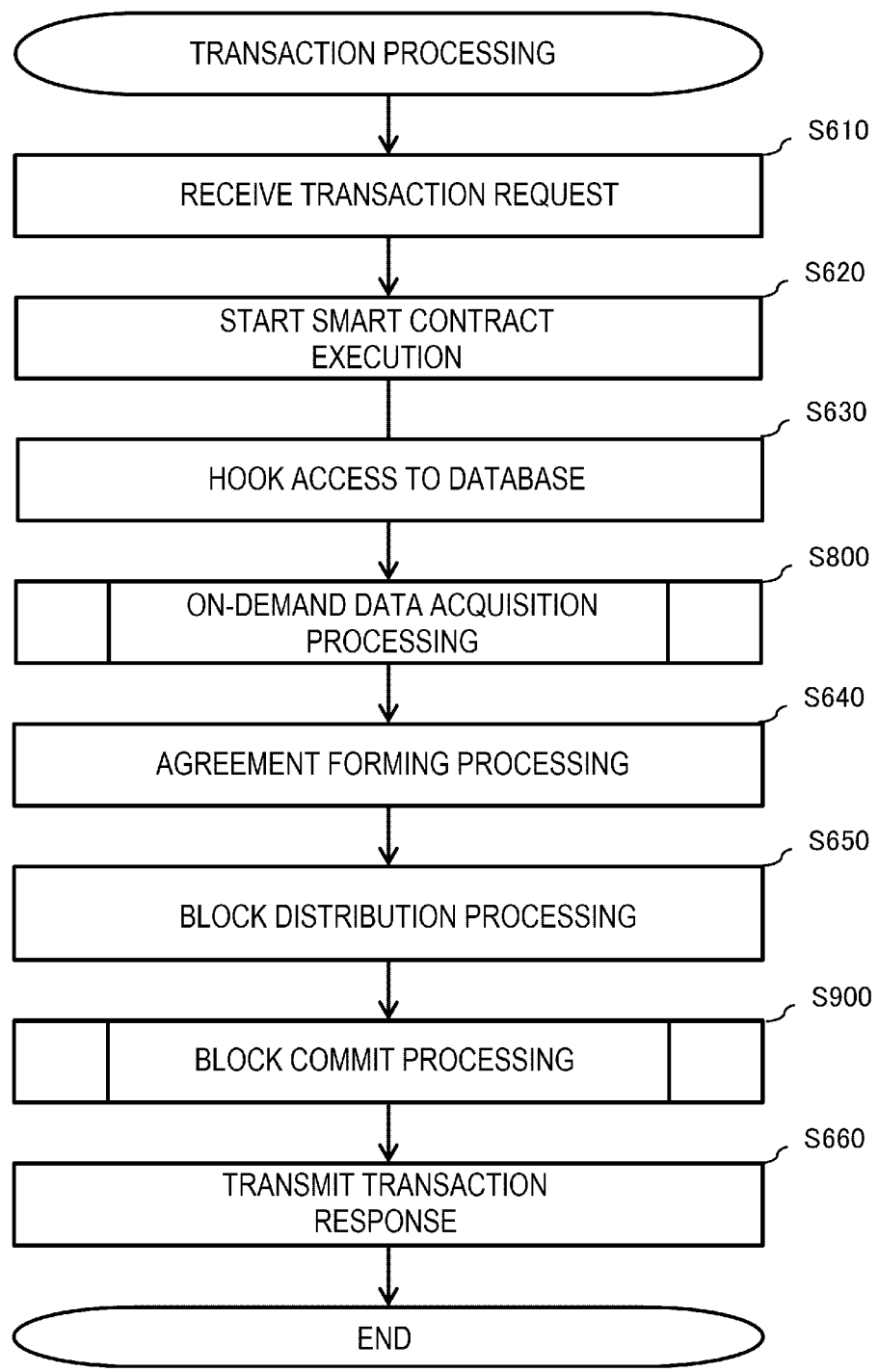
FIG. 6 is a flowchart showing an example of transaction processing of the blockchain program according to the first embodiment of the invention.

FIG. 6 shows an example of a flowchart that explains details of the transaction processing executed by the transaction processing module 320 of the blockchain program 300. The transaction processing is executed when the blockchain program 300 receives a transaction request from the client 200.

First, the transaction processing module 320 of the blockchain program 300 receives a transaction request from the client 200 (S610). The transaction request includes parameters specified at the time of execution of the smart contract 310.

Next, the transaction processing module 320 executes the smart contract 310 specified by the transaction request (S620). The smart contract 310 issues access (access request) to the database 285 to acquire the blockchain data 290 which is required for executing the transaction request.

The transaction processing module 320 hooks all access to the database 285 from the smart contract 310 utilizing the database access module 360 (S630).

With respect to access to the hooked database 285, the transaction processing module 320 causes the on-demand data acquisition module 340 to acquire data from the existing server 220 or read data (blockchain data 290) held by the database 285 of the own server 220 (S800).

The smart contract 310 executes the processing corresponding to the transaction request with the data acquired by the on-demand data acquisition module 340. Here, an execution result of the smart contract 310, that is, the data to be reflected in a return value or the blockchain data 290 is saved in the memory 270 for use in an agreement forming processing.

Then, the transaction processing module 320 executes the agreement forming processing (S640). The agreement forming processing is executed to commit the same execution results of the transaction among the plurality of servers 220. For example, the transaction processing module 320 utilizes a Practical Byzantine Fault Tolerance protocol to ensure that the plurality of servers 220 generate the same transaction execution result.

Next, the transaction processing module 320 generates the block data 700 including the execution result of the transaction based on the execution result of the transaction agreed and formed in step S640, and distributes the generated block data to other servers 220 (S650).

Then, the transaction processing module 320 writes the execution result of the smart contract 310 to the blockchain data 290 (S900).

Finally, the transaction processing module 320 transmits a response for the transaction request to the client 200 (S660).

Through the above processing, the on-demand data acquisition module 340 hooks all access to the database 285 from the smart contract 310, and acquires required data from the database of the own server 220 or another server 220, so that the data can be reliably acquired even in a case where the server 220 to be added in the blockchain system has a different type of file system and database. The on-demand data acquisition module 340 can smoothly execute the transaction processing by passing the acquired data to the smart contract 310.

Figure 7:
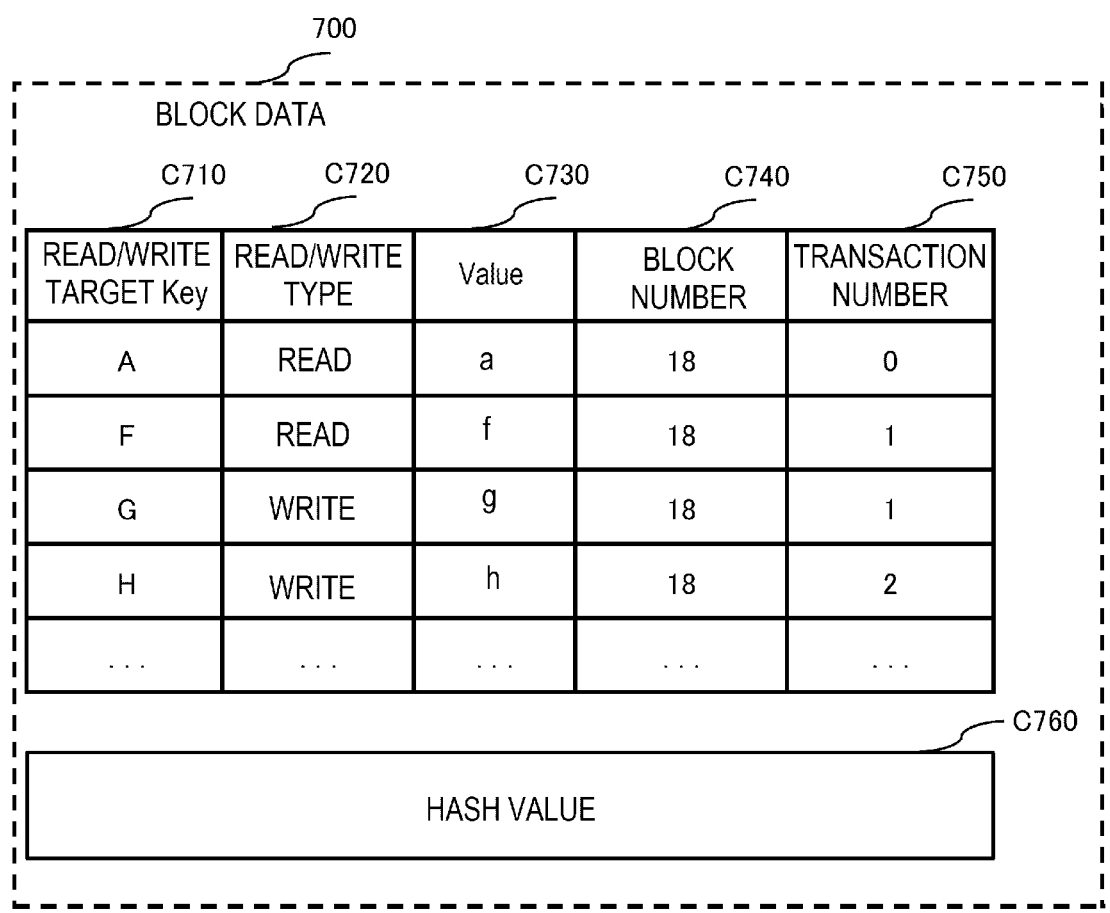
FIG. 7 is a diagram showing an example of a configuration of block data according to the first embodiment of the invention.

FIG. 7 is a diagram showing an example of constituent elements of the block data 700 in which the transaction execution result is stored.

The block data 700 is generated from one or more transaction execution results, and the blockchain program 300 commits this block data (S900), so that the transaction execution result is stored in the database 285.

The block data 700 includes a read/write target Key C710, a read/write type C720, a Value C730, a block number C740, and a transaction number C750 in one entry, and further includes a hash value C760.

The read/write target Key C710 indicates which Key of the database 285 is read or written for a transaction. The read/write type C720 indicates whether the Key of the read/write target Key C710 has been read or written. The Value C730 indicates a value read or written with respect to the Key of the read/write target Key C710.

The block number C740 indicates a number of a block that includes the execution result of this transaction. The block number is a unique numerical value. For example, when the blockchain program 300 generates a new block data 700, a block number C740 which is larger than the block number C740 of the previous block data 700 by one is adopted. Note that, in one block data 700, the block number C740 all holds the same value. The transaction number C750 indicates the number of transactions in this block.

The hash value C760 stores a hash value generated from the value of the block data and a hash value of a previous block. The new server acquires the latest block data 700 at the time of initialization of the on-demand data acquisition. A hash value for next block data can be generated by using the latest block data.

Figure 8:
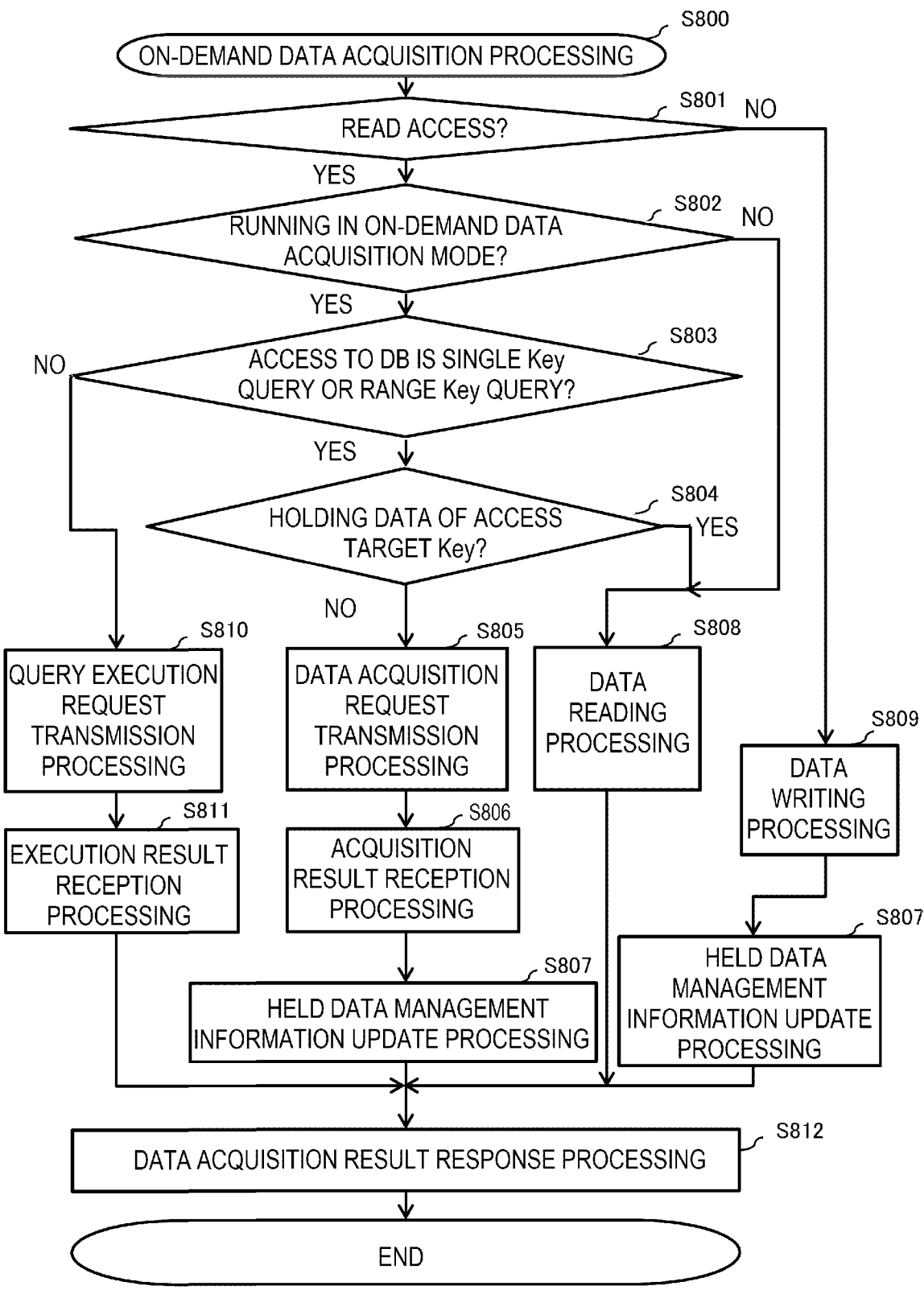
FIG. 8 is a flowchart showing an example of on-demand data acquisition processing according to the first embodiment of the invention.

FIG. 8 shows an example of a flowchart that explains details of the on-demand data acquisition processing executed by the on-demand data acquisition module 340. This processing is executed in step S800 of FIG. 6.

Once the transaction processing module 320 on the blockchain program 300 hooks the access to the database 285 of the smart contract 310, the transaction processing module 320 utilizes the on-demand data acquisition module 340 to execute the on-demand data acquisition processing.

The transaction processing module 320 passes the interface name C510 and the information of the input C530 to the on-demand data acquisition module 340 based on the hooked information.

First, the on-demand data acquisition module 340 determines whether the access to the database 285 is a read type or a write type (S801). The on-demand data acquisition module 340 proceeds to step S802 in the case of read access, and proceeds to step S809 in the case of write access.

Next, in step S802, the on-demand data acquisition module 340 determines whether the blockchain program 300 being executed by itself is running in the on-demand data acquisition mode (S802). If the blockchain program 300 is executed in the on-demand data acquisition mode, the on-demand data acquisition module 340 proceeds to step S803, otherwise proceeds to step S808.

Since the blockchain program 300 is not executed in the on-demand data acquisition mode in step S808, the on-demand data acquisition module 340 reads a Value for the requested Key from the database 285 on the server 220 being executed itself.

On the other hand, since the blockchain program 300 is executed in the on-demand data acquisition mode in step S803, the on-demand data acquisition module 340 then determines whether the interface type C520 of the access to the database 285 is a single Key query or range Key query (S803).

If the interface type C520 of the access to the database 285 is a single Key query or range Key query, the process proceeds to step S804, and the on-demand data acquisition module 340 can determine which Key's Value is required by the smart contract 310.

Therefore, if the interface type C520 of the access to the database 285 is a single key query or range key query, the on-demand data acquisition module 340 determines whether the database 285 of the own server 220 holds the Value of the required Key by referring to the held data management information 1300 (S804).

If the data to be accessed is stored in the database 285 of the own server 220, the on-demand data acquisition module 340 proceeds to step S808 and reads the data from the database 285. If the data to be accessed does not exist in the own server 220, the on-demand data acquisition module 340 proceeds to step S805 and transmits an on-demand data acquisition request to the server 220 described as the on-demand data acquisition source C420 of the running mode flag information 400 added with the information of the interface name C510 and the input C530.

The on-demand data acquisition module 340 on another server 220 that has received the on-demand data acquisition request accesses the database 285 based on the received interface name C510 and the information of the input C530, acquires the data to be accessed, and transmits the data as a result of the on-demand data acquisition request (S806).

Upon receiving the result of the on-demand data acquisition request from another server 220 (S807), the on-demand data acquisition module 340 updates the held data management information 1300 (S812).

If the interface type C520 of the access to the database 285 is not the single Key query nor the range Key query in the determination in step S803, the on-demand data acquisition module 340 proceeds to step S810 and transmits a query execution request to the existing server 220 (S810).

Upon receiving the query execution request, the existing server 220 executes the query and transmits a result of the query. Upon receiving the result (S811), the on-demand data acquisition module 340 returns the data acquisition result to the smart contract 310 and updates the held data management information 1300 without executing the processing of step S807 (S812). The reason why the processing in step S807 is not executed is that, if the interface type C520 of the access to the database 285 is not the single Key query nor the range Key query, the on-demand data acquisition module 340 cannot determine which Key's Value is required by the smart contract 310 and cannot update the held data management information 1300.

If the access to the database 285 is determined as a write access in step S801, a write processing is executed (S809), Key written to the held data management information 1300 is registered (S807), and a write completion response is returned to the smart contract 310 (S812).

Through the above processing, when the access to the database 285 is read and there is no data to be accessed in the own server 220, the on-demand data acquisition module 340 can transmit a data acquisition request or a query execution request to another server 220, thereby acquiring the data to pass to the smart contract 310.

Further, the on-demand data acquisition module 340 divides the processing for each type of the query and requests the existing server 220-1 to execute the processing, so that the existing server 220-1 is requested to process all queries specific to the database 285 when which Key is required cannot be determined. In this way, an accurate execution result can be obtained.

Figure 9:
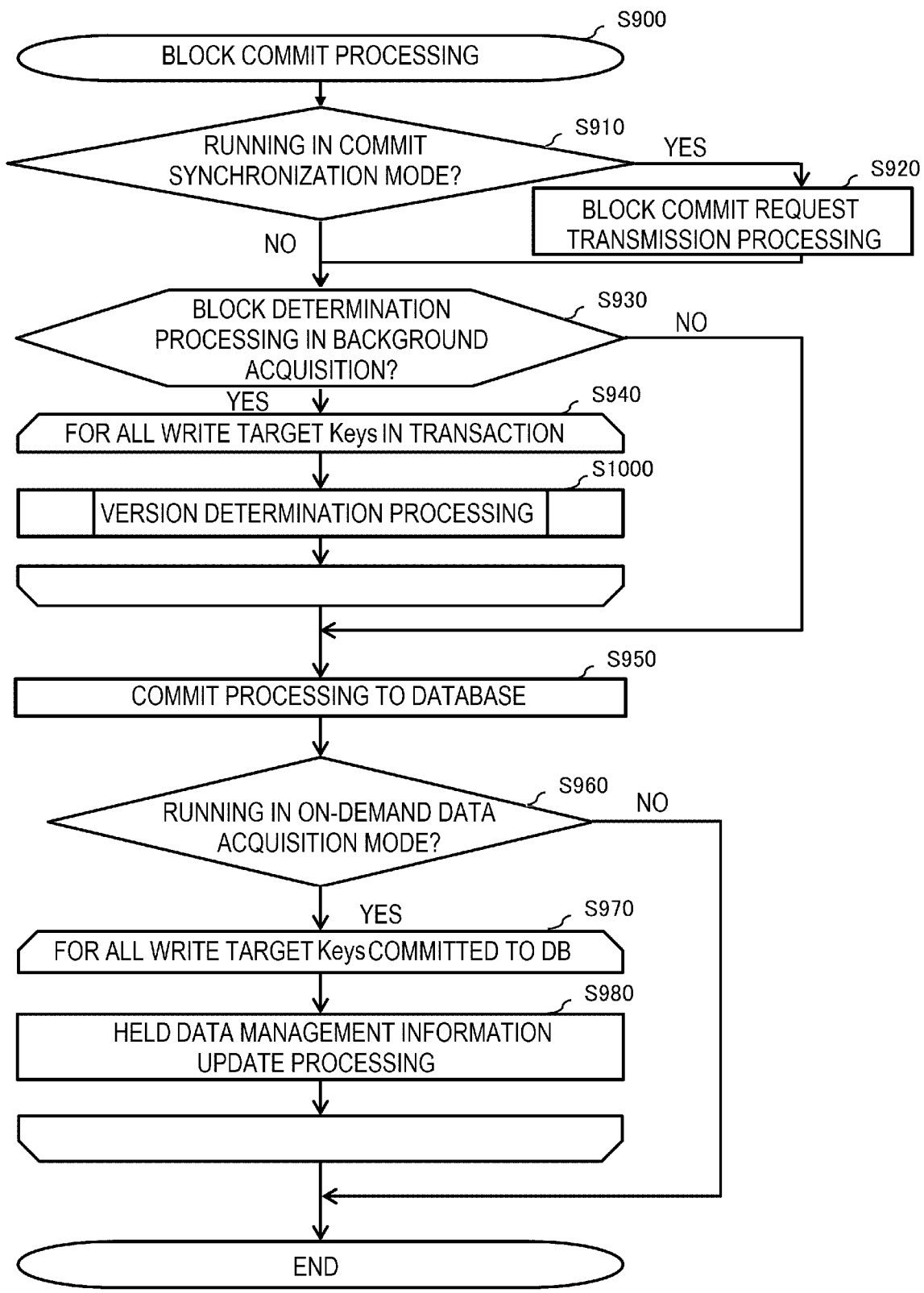
FIG. 9 is a flowchart showing an example of block data determination acquisition processing according to the first embodiment of the invention.

FIG. 9 shows an example of a flowchart that explains details of block commit processing which is executed when the transaction processing module 320 of the blockchain program 300 commits the block data 700 to the database 285. This processing is executed in step S900 of FIG. 6.

First, the blockchain program 300 refers to the running mode flag information 400 to acquire whether the commit synchronization mode C430 is "true", and determines whether the own server 220 is running in the commit synchronization mode (S910).

When the own server 220 is running in the commit synchronization mode, the blockchain program 300 transmits the block data 700 in the commit processing to the server 220 specified by the commit synchronization target C440 of the running mode flag information 400, and waits for a response (S920). Upon receiving the block data 700, the server 220 returns a response as a block commit processing completion notification after executing step S930 and subsequent steps of the block commit processing (S900). As a result, the existing server 220-1 can also synchronously reflect updated contents of the blockchain data 290 to the new server 220. Therefore, the blockchain system can ensure the consistency of the blockchain data 290.

Next, the blockchain program 300 determines whether this block commit processing is based on the background acquisition processing (S1100 in FIG. 11) (S930). If it is based on the background acquisition processing, the process proceeds to step S940, otherwise the process proceeds to step S950.

In step S940, the blockchain program 300 repeatedly executes the processing of step S1000 for execution results of all transactions in which the read/write type C720 of the block data 700 is a write type.

In step S1000, the blockchain program 300 determines whether the value to be written is earlier than the value existing in the database 285. This processing will be described in detail with reference to FIG. 10. Block data reception processing based on the background acquisition does not acquire latest block data 700 but acquires the previous block data 700. Therefore, some Keys may have already been acquired in the execution results of the transactions included in the block data 700 acquired by the background acquisition. At this time, it is necessary to exclude these Keys from targets to be written in step S1000.

Then, the blockchain program 300 commits the Value C730, the block number C740, and the transaction number C750 to the database 285 for the Keys not excluded from targets to be written (S950).

Next, the blockchain program 300 determines whether itself is running in the on-demand data acquisition mode by referring to the running mode flag information 400 based on whether the on-demand data acquisition mode C410 is "true" (S960). If the blockchain program 300 is running in the on-demand data acquisition mode, the process proceeds to step S970, otherwise the process is terminated.

In step S970, the blockchain program 300 repeatedly executes the processing of step S980 for all Keys to be written that have been committed to the database 285 in step S950.

In step S980, the blockchain program 300 adds every Key to the held data management information 1300, and stores information indicating that the Keys have already been acquired (S980).

Through the above processing, the determination processing of the generated block data 700 and the commit processing to the database 285 are completed.

Figure 10:
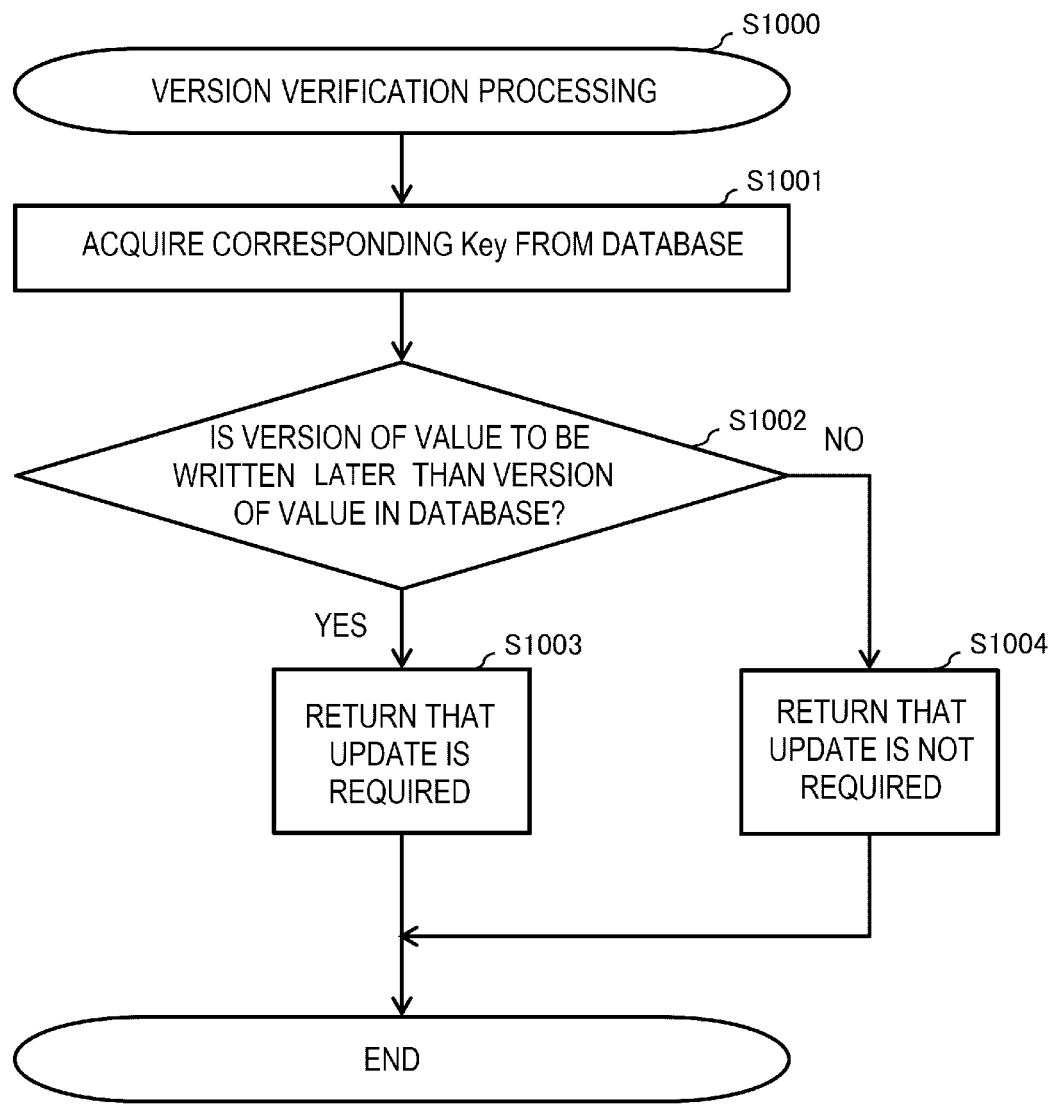
FIG. 10 is a flowchart showing an example of version verification processing according to the first embodiment of the invention.

FIG. 10 shows an example of a flowchart that explains details of version verification processing of write data in the block data determination processing executed by the blockchain program 300. This processing is executed in step S1000 of FIG. 9.

When the block data 700 is committed, the blockchain program 300 compares the version of the value already stored in the database 285 with the version of the write data in the execution result of each transaction in which the read/write type C720 of the block data 700 is "write".

First, the blockchain program 300 acquires data corresponding to the Key (C710) of the execution result of the transaction from the database 285 (S1001).

Next, the blockchain program 300 acquires the block number C740 and the transaction number C750 from the block data 700 of the execution result of the transaction, and compares the block number C740 with the transaction number C750 of the data acquired from the database 285 (S1002).

When the execution result of the transaction in the block data 700 is stored in the database 285, the blockchain program 300 stores the block number C740, the transaction number C750 and the Value C730, so that the version verification processing can be executed by the comparison in the step S1002.

If the data of the execution result of the transaction is later than the data in the database 285, a response that an update is required is returned (S1003), and if the data of the execution result is earlier than the data in the database 285, a response that an update is not required is returned (S1004).

Through the above processing, the blockchain program 300 can prevent an execution result of a previous transaction from being overwritten in the data of the database 285.

Figure 11:
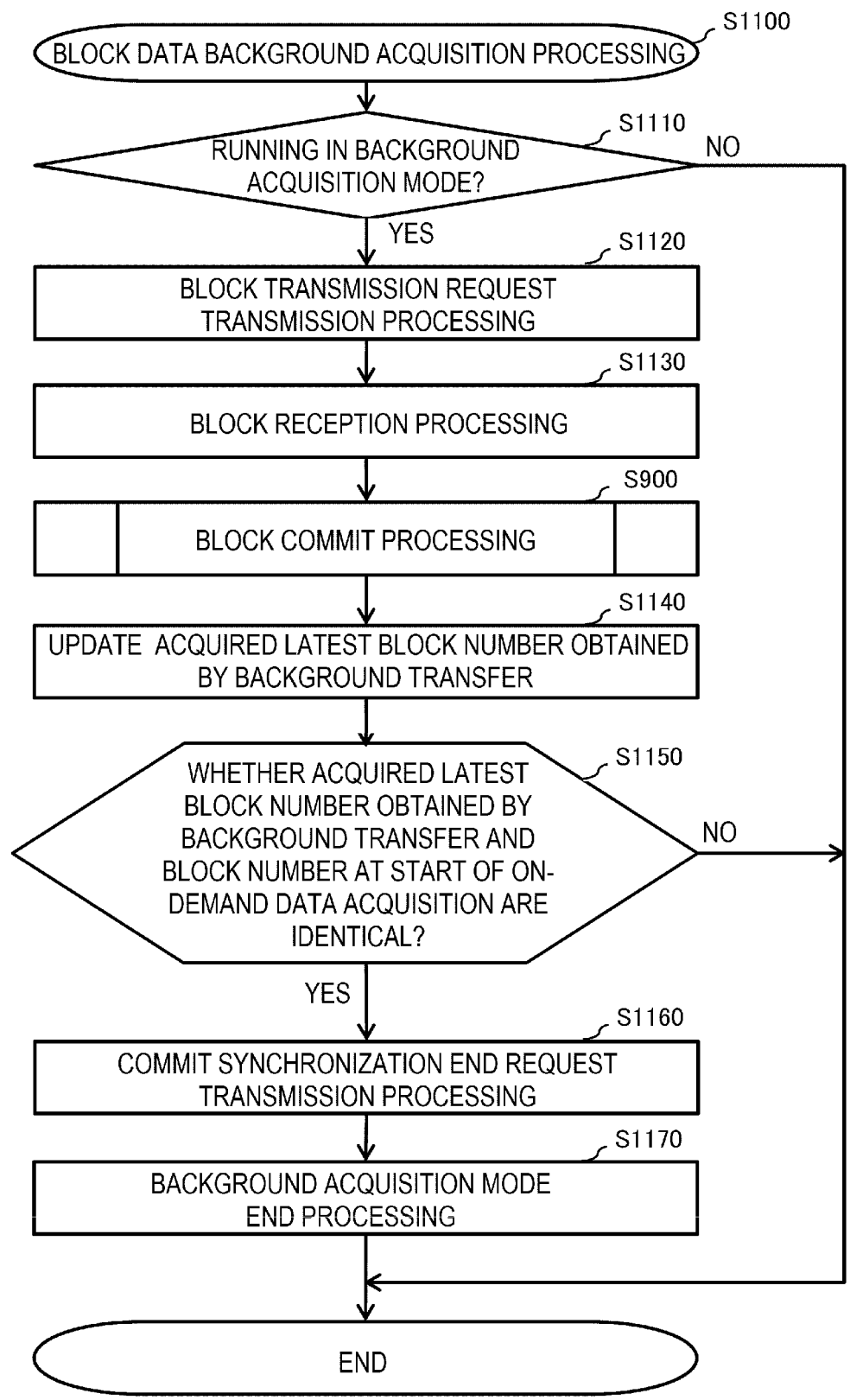
FIG. 11 is a flowchart showing an example of block data background acquisition processing according to the first embodiment of the invention.

FIG. 11 shows an example of a flowchart that explains details of block data background acquisition processing executed by the background acquisition module 350 of the blockchain program 300.

The block data background acquisition processing is executed based on a schedule determined in advance by a timer and the like. First, the background acquisition module 350 determines whether the background acquisition module 350 itself is running in the background acquisition mode, based on the background acquisition mode C450 of the running mode flag information 400 (S1110).

When the background acquisition module 350 is running in the background acquisition mode, the process proceeds to step S1120. The background acquisition module 350 transmits a transmission request of the block data 700 added with the block number of the requested block data to any other server 220 specified by the background data acquisition source C460 of the running mode flag information 400 (S1020).

The block number requested by the background acquisition module 350 is selected to be larger than the value of the acquired latest block number C1410 obtained by the background acquisition of the on-demand data acquisition progress management information 1400 shown in FIG. 14 by "1", and is acquired in the background sequentially based on the previous block number.

An initial value of the acquired latest block number C1410 obtained by the background acquisition processing may be set to the same value as the block number C1420 at the start of the on-demand data acquisition, and may be acquired sequentially based on a new block number by selecting a value which is smaller by "1" each time.

Upon receiving the block transmission request from the background acquisition module 350, the server 220 returns the block data 700 of the requested block number. Next, after receiving the transmission request block data 700 (S1130), the background acquisition module 350 commits the block data 700 by the block commit processing (S900). The block commit processing is executed in the flowchart of FIG. 9 described above.

Next, the background acquisition module 350 updates the value of the acquired latest block number C1410 obtained by the background acquisition of the on-demand data acquisition progress management information 1400 with the block number committed in step S900 (S1140).

Next, the background acquisition module 350 compares the value of the acquired latest block number C1410 obtained by the background acquisition of the on-demand data acquisition progress management information 1400 with the value of the block number C1420 at the start of the on-demand data acquisition (S1150).

If the value of the acquired latest block number C1410 and the value of the block number C1420 at the start of the on-demand data acquisition are identical, the process proceeds to step S1160, otherwise the process terminates.

In step S1160, the background acquisition module 350 determines that all the background acquisition processing has been completed, and thereafter, the commit synchronization processing (step S920 in FIG. 9) for the on-demand data acquisition processing is not required, so that the background acquisition module 350 transmits a commit synchronization termination request to a server 220 specified by the on-demand data acquisition source C420 of the running mode flag information 400 (S1160).

The blockchain program 300 on the server 220 that has received the commit synchronization termination request sets the commit synchronization mode C430 of the running mode flag information 400 as "false", and does not execute the commit synchronization processing thereafter.

Next, since the background acquisition processing is not required either thereafter, the background acquisition module 350 sets the background acquisition mode C450 of the running mode flag information 400 as "false", and stops running in the background acquisition mode (S1170).

Through the above processing, the server 220 added to the blockchain system can execute the background acquisition processing at a predetermined cycle and accumulate the block data 700 already processed by the existing server 220.

Figure 12:
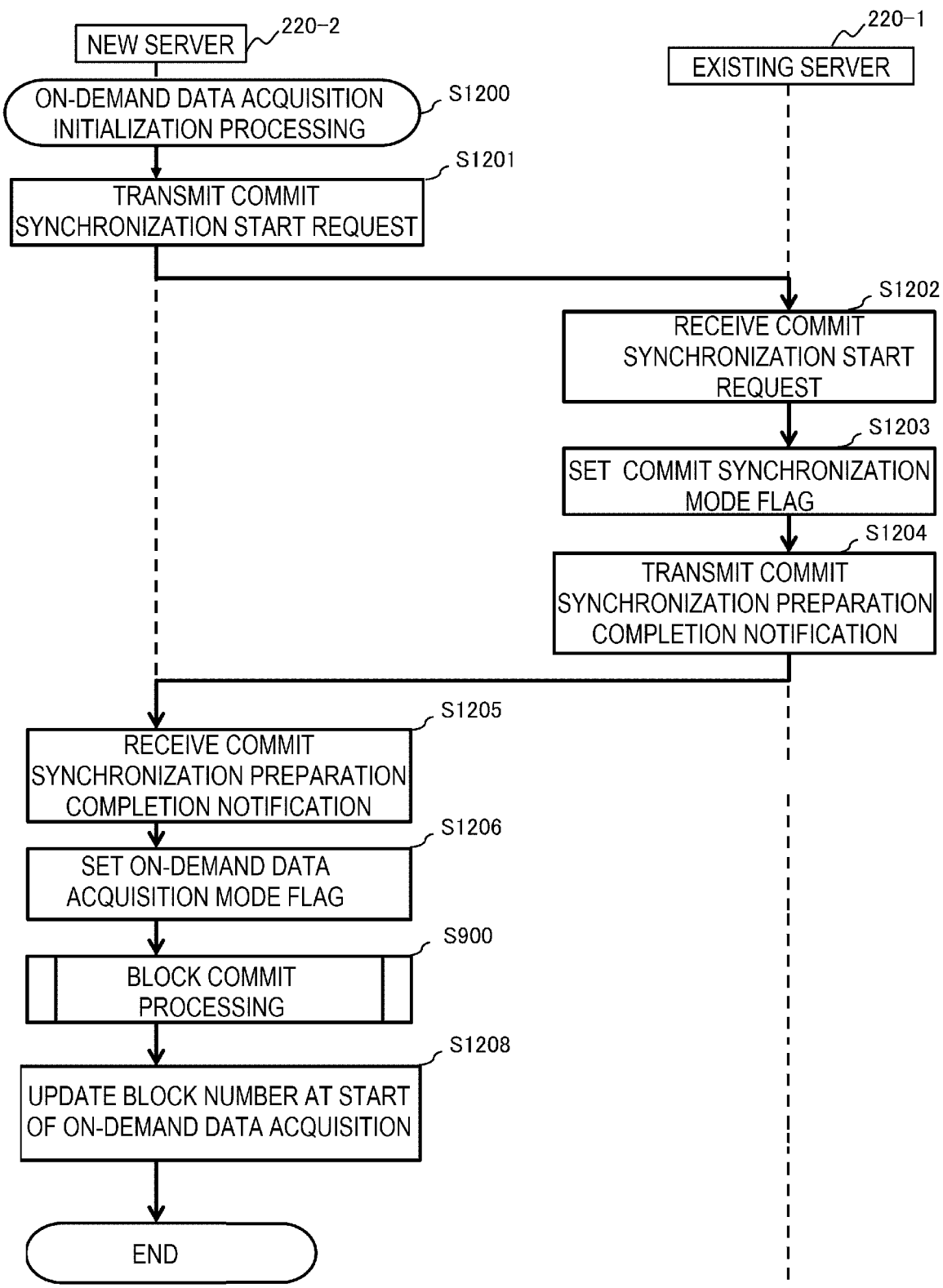
FIG. 12 is a flowchart showing an example of initialization processing for on-demand data acquisition according to the first embodiment of the invention.

FIG. 12 is a flowchart showing an example of an on-demand data acquisition initialization processing (S1200). When the blockchain system administrator and the like changes the setting of the blockchain program 300 by using the management terminal 225, the blockchain program 300 executes the initialization processing for the on-demand data acquisition processing.

First, the blockchain program 300 on the new server 220-2 transmits a commit synchronization request to a predetermined existing server 220-1 according to the running mode flag information 400 (S1201).

Upon receiving the commit synchronization request (S1202), the blockchain program 300 on the existing server 220-1 sets the commit synchronization mode C430 of the running mode flag information 400 as "true" and sets the commit synchronization mode flag (S1203). At this time, in the existing server 220-1, the information of the new server 220-2 that has transmitted the commit synchronization request is stored in the commit synchronization target C440 of the running mode flag information 400. Thereafter, when the block data 700 is committed, the blockchain program 300 of the existing server 220-1 also synchronously transmits the block data 700 to be committed to the blockchain program 300 that has transmitted the commit synchronization request in step S1201 (steps S910 and S920 in FIG. 9).

Next, the blockchain program 300 of the existing server 220-1 transmits a commit synchronization preparation completion notification and the latest block data 700 held by the blockchain program 300 (S1204).

Upon receiving the commit synchronization preparation completion notification (S1205), the blockchain program 300 of the new server 220-2 that has transmitted the commit synchronization request sets the on-demand data acquisition mode C410 of the running mode flag information 400 as "true", and sets the on-demand data acquisition mode flag (S1206). At this time, the information of the existing server 220-1 to which the commit synchronization start request is transmitted in step S1201 is stored in the on-demand data acquisition source C420 of the running mode flag information 400.

Next, in step S1204, the blockchain program 300 of the new server 220-2 commits a block of the latest block data 700 transmitted by the blockchain program 300 on the existing server 220-1 to the database 285 by the block commit processing (S900).

Next, in step S1204, the new server 220-2 sets the block number of the latest block data 700 transmitted by the blockchain program 300 on the existing server 220-1 as the value of block number C1420 at the start of the on-demand data acquisition of the on-demand data acquisition progress management information 1400 (S1208). This value is used at the time of determining the end of the background acquisition processing (S1150).

Further, through the processing of steps S900 and S1204, the blockchain program 300 of the new server 220-2 virtually holds the received block data 700 and all block data 700 earlier than the received block data 700.

That is, the new server 220-2 commits the block data 700 received from the existing server 220-1 when the on-demand data acquisition initialization processing is executed, and updates the block number C1420 at the start of the on-demand data acquisition, thereby virtually holding all the block data 700 earlier than the received block data 700. In other words, the new server 220-2 can treat the block number C1420 at the start of the on-demand data acquisition as the earliest block number.

FIG. 13 shows a configuration example of the held data management information 1300 that manages the list of Keys acquired by the on-demand acquisition processing and is used to determine whether the on-demand data acquisition processing performed by the on-demand data acquisition module 340 is required.

The held data management information 1300 is held in the memory 270 by the blockchain program 300, but may also be stored in the disk drive 280. The data of the held data management information 1300 includes an interface type C1310, a start Key C1320, and an end Key C1330.

The interface type C1310 is used to determine an acquired Key of which interface type the data indicates. The start Key C1320 indicates the acquired Key when the interface type C1310 is a single Key query, and indicates the start Key of the range when the interface type C1310 is the range Key query. The end Key C1330 indicates the end Key of the range when the interface type C1310 is the range Key query.

FIG. 14 shows a configuration example of the on-demand data acquisition progress management information 1400 held by the on-demand data acquisition module 340 on the blockchain program 300. The on-demand data acquisition progress management information 1400 is management information used by the background acquisition module 350 to determine the end of background acquisition.

The on-demand data acquisition progress management information 1400 is held in the memory 270 by the blockchain program 300, but may also be stored in the disk drive 280. The on-demand data acquisition progress management information 1400 includes the acquired latest block number C1410 obtained by the background acquisition and the block number C1420 at the start of the on-demand data acquisition.

The acquired latest block number C1410 obtained by the background initiates with a value of 0, and is updated when the background acquisition module 350 receives the block data. The block number C1420 at the start of the on-demand data acquisition is set by the blockchain program 300 in the on-demand data acquisition initialization processing (S1200).

As described above, according to the first embodiment, the server 220-2 newly added to the blockchain system does not acquire all the blockchain data 290 in advance, but acquires data on demand from the existing server 220-1 by the on-demand data acquisition module 340 in the blockchain program 300.

Therefore, even if the existing blockchain data 290 has a large volume, the blockchain program 300 on the newly added server 220-2 can quickly start the transaction processing. Since the on-demand data acquisition processing is executed in the blockchain program 300, the consistency of the blockchain data 290 is not impaired.

In addition, when the existing server 220-1 updates its own blockchain data 290, the updated content is also reflected synchronously in the new server 220-2. Since the on-demand data acquisition module 340 executes the on-demand data acquisition processing considering that there are a plurality of types of access interfaces from the smart contract 310 to the database 285, the consistency of the execution result of the transaction is not impaired.

In the first embodiment, the database 285 that holds the blockchain data 290 being stored in the disk drive 280 has been described as an example, but the invention is not limited thereto, and the database 285 may also be stored in a storage device connected to the server 220. Further, the database 285 being configured in a Key-Value format has been described as an example, but the invention is not limited thereto, and a relational format and the like may also be adopted.

Second Embodiment

A second embodiment of the invention will be described in detail below with reference to the drawings. In the following description, only differences from the first embodiment are shown.

In the first embodiment, the server 220 of the on-demand data acquisition source needs to be a fixed server. By the commit synchronization processing (step S920 in FIG. 9), the new server 220-2 and the existing server 220-1 hold the block data 700 after the block number C1420 at the start of the on-demand data acquisition in a state of being synchronized at all times.

However, when the new server 220-2 transmits the commit synchronization request again to another existing server 220-n (step S1201 in FIG. 12), which block data 700 is held by the new server 220-2 and the existing server 220-n is not considered in the first embodiment. Therefore, the commit synchronization processing is not normally executed, and the block data 700 may be lost on the new server 220-2 side.

For example, in a state where the new server 220-2 holds the block data 700 up to the block number 10 and the existing server 220-n holds the block data up to the block number 12, when the on-demand data acquisition initialization processing S1200 (FIG. 12) is executed, the existing server 220-n commits synchronization of the block data 700 whose block number starts from the block number 13 to the new server 220-2, and therefore, the new server 220-2 fails to receive the block data whose block numbers are 11 and 12.

Therefore, in the second embodiment, in the on-demand data acquisition initialization processing, commit synchronization start processing is executed in consideration of the block numbers possessed by the new server 220-2 and the existing server 220-1.

Figure 15:
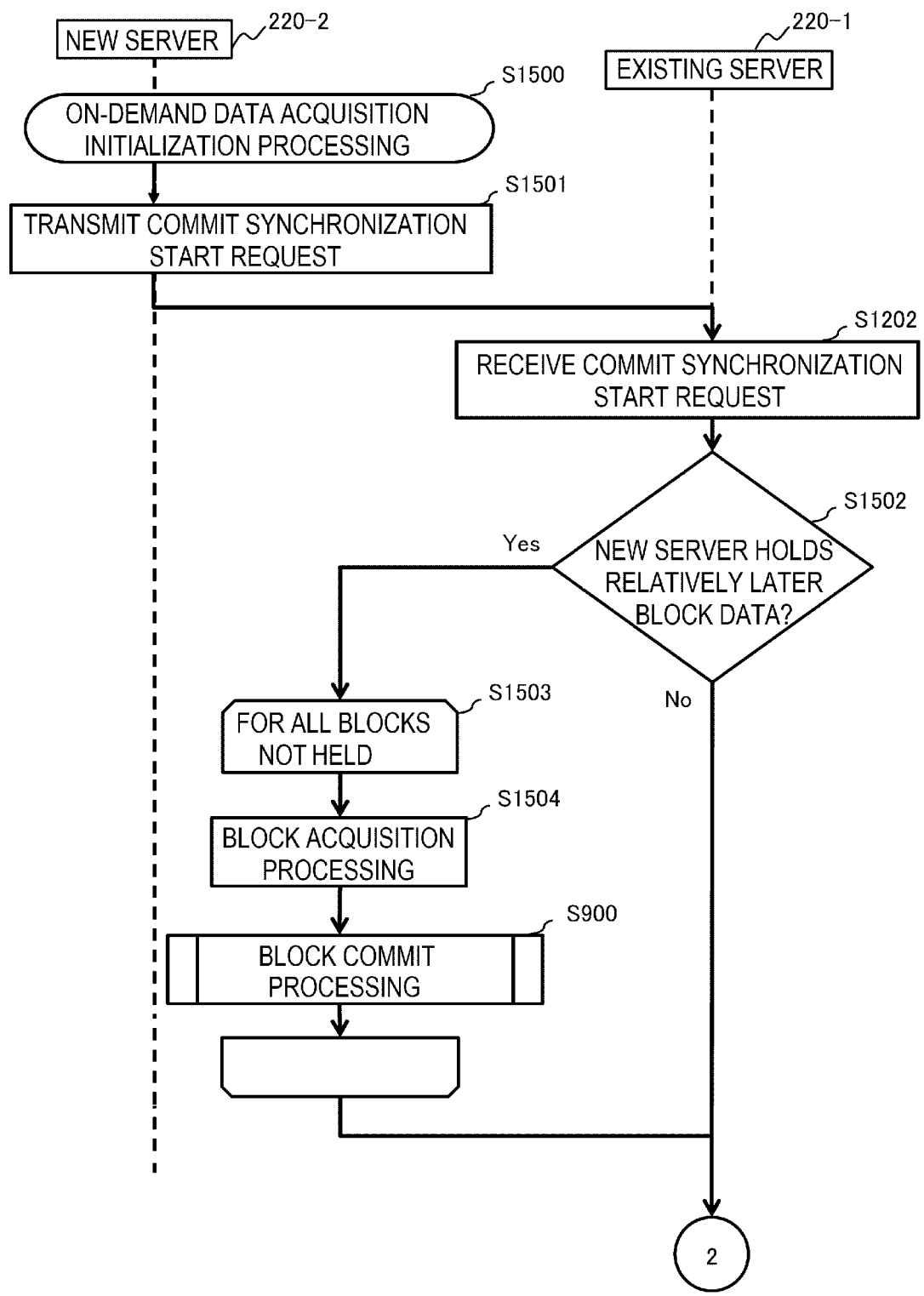
FIG. 15 is a first half of a flowchart showing an example of initialization processing for on-demand data acquisition according to a second embodiment of the invention.
Figure 16:
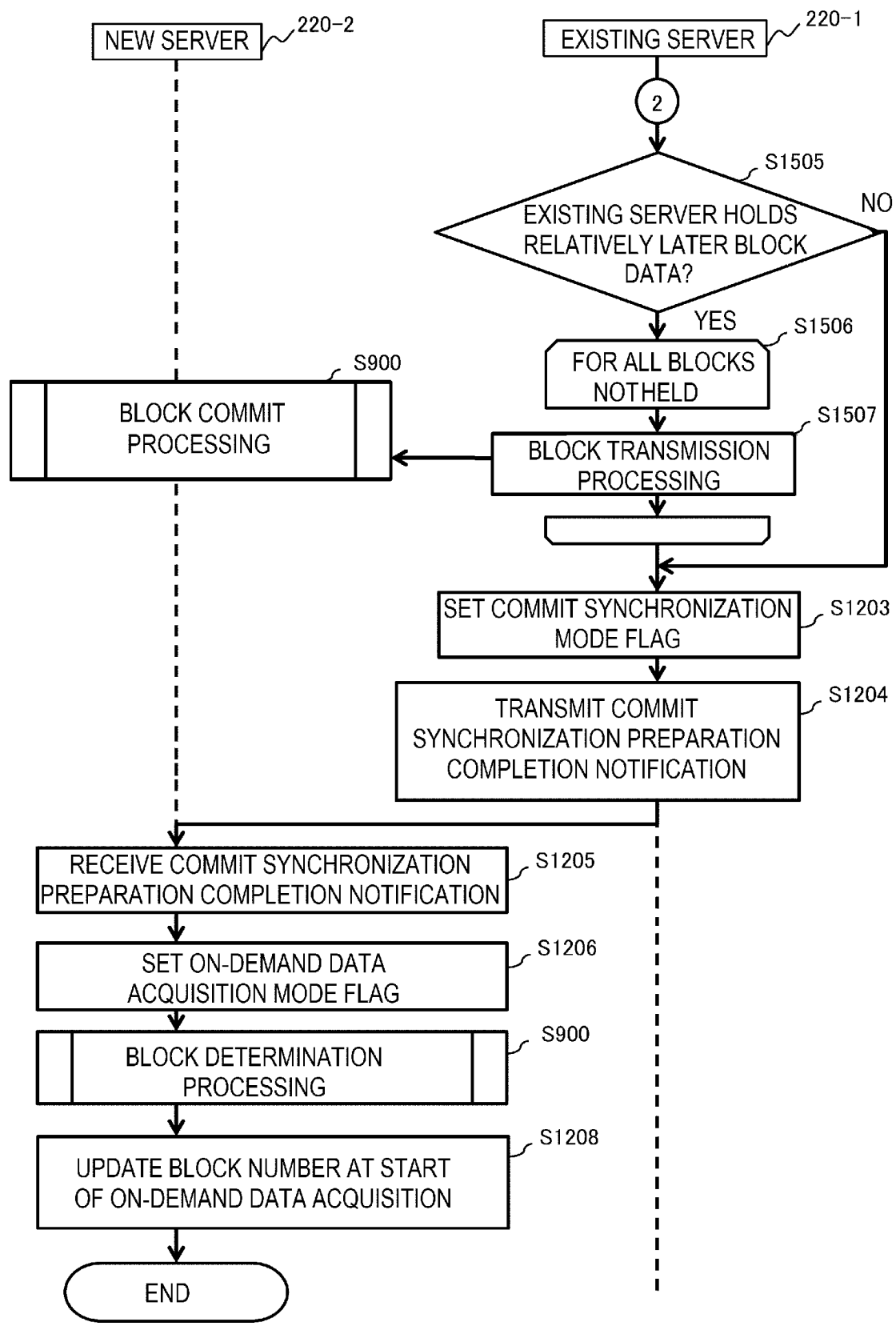
FIG. 16 is a second half of the flowchart showing the example of the initialization processing for on-demand data acquisition according to the second embodiment of the invention.

FIGS. 15 and 16 show examples of flowcharts that describe in detail the on-demand data acquisition initialization processing (S1500). This processing is executed in a similar manner as shown in FIG. 12 of the first embodiment, but the processing from step S1501 to step S1507 is different from that of the first embodiment.

First, the blockchain program 300 of the new server 220-2 transmits a commit synchronization start request added with information of the latest block number of the block data 700 held by the blockchain program 300 of the new server 220-2 itself to the blockchain program 300 of the existing server 220-1 (S1501).

Upon receiving the commit synchronization start request, the blockchain program 300 of the existing server 220-1 compares the latest block number of the block data 700 held by the new server 220-2 with the latest block number C1410 of the block data held by the existing server 220-1 (S1502).

When the new server 220-2 holds the relatively new block data 700, the blockchain program 300 on the existing server 220-1 acquires all the new block data 700 that is not held by itself but by the new server 220-2 (S1503) from any other server 220-n (S1504), and executes the block commit processing (S900).

In addition, the latest block number of the block data 700 held by the new server 220-2 is compared with the latest block number of the block data 700 held by the existing server 220-1 (S1505).

When the existing server 220-1 holds the relatively new block data 700, the blockchain program 300 on the existing server 220-1 transmits all the new block data that is held by itself but not held by the new server 220-2 (S1506) to the blockchain program 300 on the new server 220-2 (S1507).

Upon receiving the block data, the blockchain program 300 on the new server 220-2 executes the block data determination processing (S900), and the subsequent processing (S1250 to S1208) is to the same as that in the first embodiment.

When the on-demand data acquisition source is changed for the new server 220-2, the administrator of the blockchain system rewrites the on-demand data acquisition source C420 of the running mode flag information 400 to information of another server 220, and executes the on-demand data acquisition initialization processing S1500 shown in FIGS. 15 and 16 again.

Then, the blockchain program 300 of the new server 220-2 transmits the processing since the start of the commit synchronization to a server 220-n which is different from the one before the change, so that the commit synchronization is started from the different server 220-*n* and the on demand data acquisition processing can be executed.

As described above, according to the second embodiment, the server 220-2 newly added to the blockchain system does not acquire all the blockchain data 290 in advance, but acquires data on demand from the existing server 220-1 by the on-demand data acquisition module 340 in the blockchain program 300. At this time, since the on-demand data acquisition source server 220-1 can be changed later, loads do not continue to concentrate on a specific server 220.

Further, in the second embodiment, since the on-demand data acquisition source server can be changed, the versions (block numbers) of the block data 700 held in the blockchain program 300 of the new server 220-2 and the blockchain program 300 of the existing server 220-1 are compared when the on-demand data acquisition processing is executed. By matching both versions first, even if the new server 220-2 previously executed the on-demand data acquisition processing from another existing server 220-*n*, the on-demand data acquisition processing can be executed from the new existing server 220-1 without impairing the data.

Third Embodiment

A third embodiment of the invention will be described in detail below with reference to the drawings. In the following description, only differences from the second embodiment are shown.

The third embodiment differs from the second embodiment in that on-demand data acquisitions are performed at the same time from a plurality of servers 220 since the plurality of servers 220 as the on-demand data acquisition sources can be set at the same time. As a result, the on-demand data acquisition processing can be executed without load imbalance on a specific server 220.

FIG. 17 is a configuration diagram of running mode flag information 1700 according to the third embodiment. In the third embodiment, the running mode flag information 1700 is used instead of the running mode flag information 400 shown in FIG. 4 of the first embodiment.

The running mode flag information 1700 differs from the running mode flag information 400 (FIG. 4) in the first and second embodiments in an on-demand data acquisition source C1710 and a commit synchronization target C1720.

The on-demand data acquisition source C1710 and the commit synchronization target C1720 of the running mode flag information 1700 according to the third embodiment can set information of a plurality of servers 220. The administrator and the like of the blockchain system uses the management terminal 225 to set the information of a predetermined number of servers 220 in the on-demand data acquisition source C1710.

Figure 18:
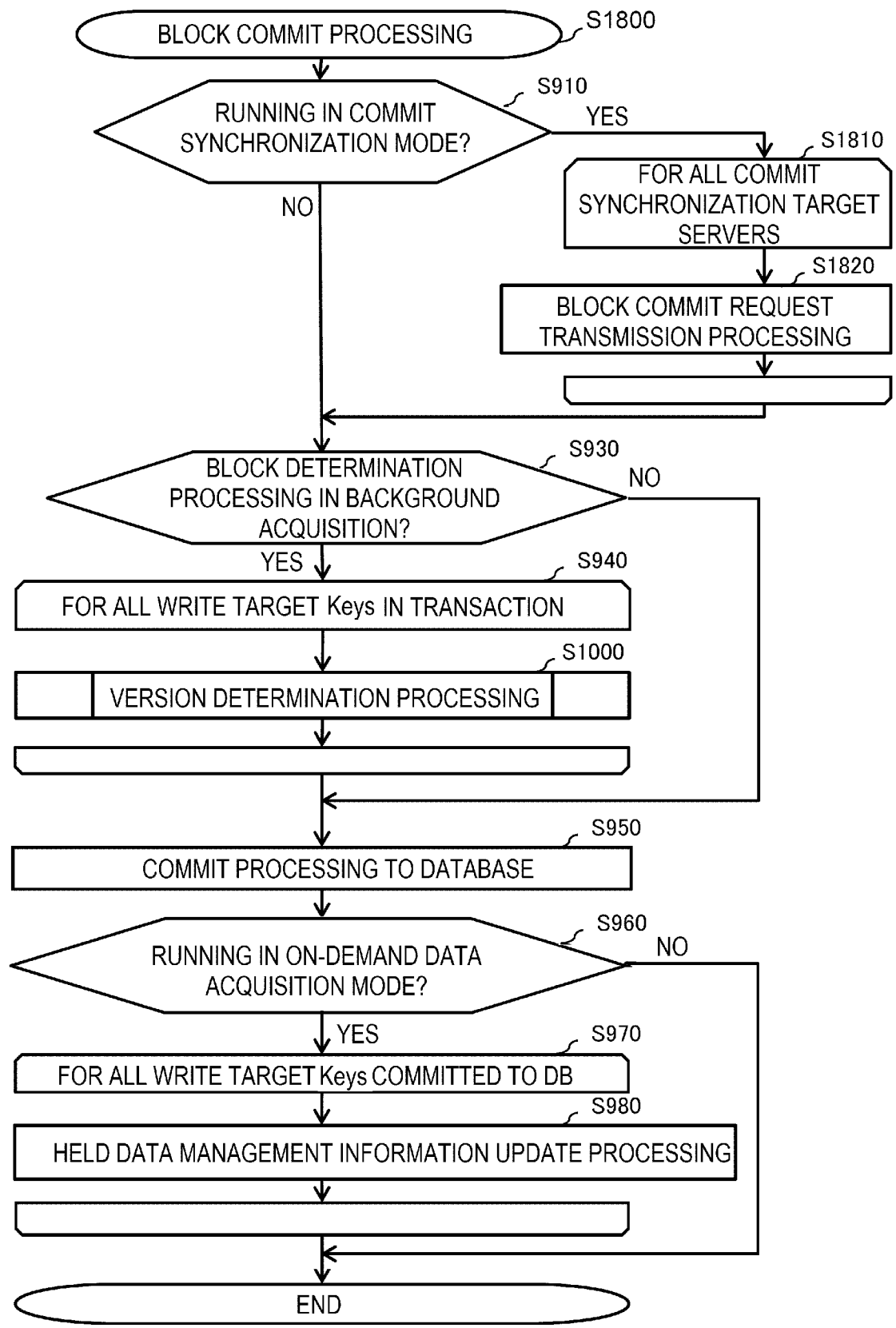
FIG. 18 is a flowchart showing an example of block commit processing according to the third embodiment of the invention.

FIG. 18 shows an example of a flowchart that describes the details of the block data determination processing executed by the blockchain program 300 according to the third embodiment. The differences from the block data determination processing (FIG. 9) in the first and second embodiments are in steps S1810 and S1820.

First, the blockchain program 300 acquires the result of whether the commit synchronization mode C430 of the running mode flag information 400 is "true" and determines whether the blockchain program 300 is running in the commit synchronization mode (S910).

If the blockchain program 300 is running in the commit synchronization mode, the blockchain program 300 transmits the block data 700 in the commit processing to the all servers 220 specified by the commit synchronization target C1720 of the running mode flag information 1700 (S1810), and waits for a response (S1820).

Upon receiving the block data 700, the server 220 performs step S930 and subsequent steps of the block commit processing, and then returns a response of the block commit processing completion notification to the transmission source server 220. When blockchain program 300 completes the processing of step S1820 for all the servers 220 of the commit synchronization target C1720, the process proceeds to step S930.

Step S930 and subsequent steps are to the same as that in the first embodiment, and the determination processing of the block data 700 and the commit processing of the database 285 are completed.

Figure 19:
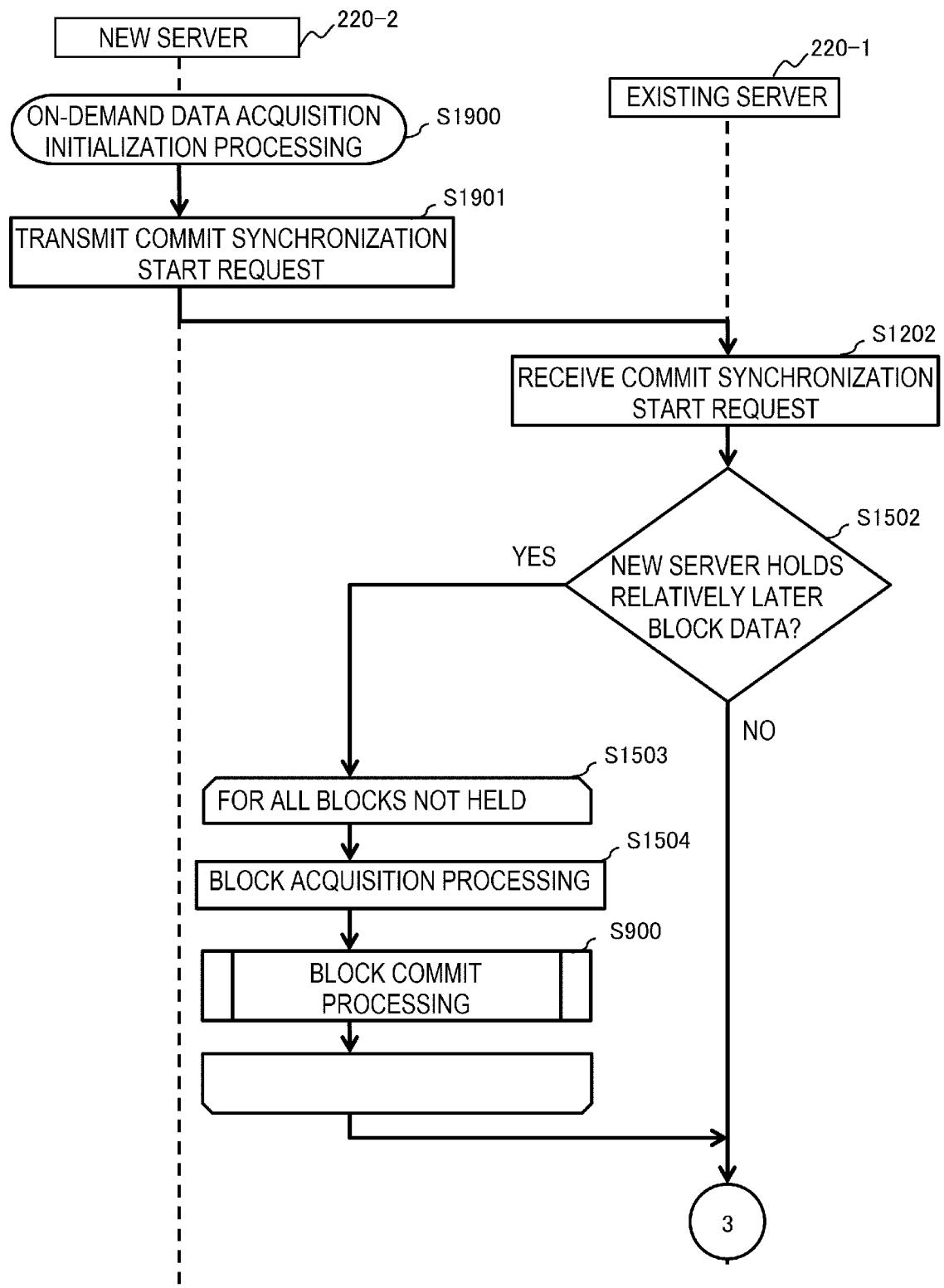
FIG. 19 is a first half of a flowchart showing an example of initialization processing for on-demand data acquisition according to the third embodiment of the invention.
Figure 20:
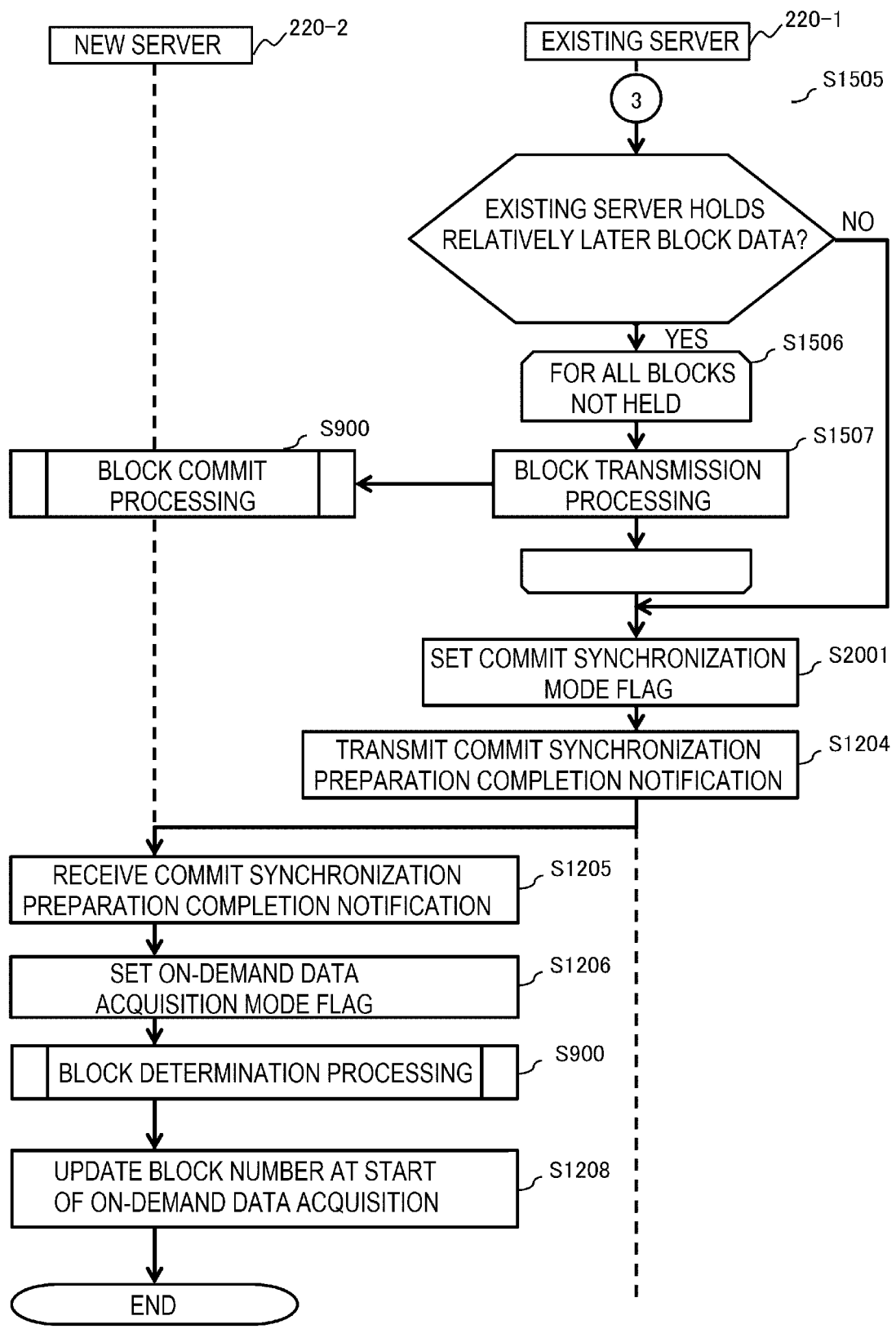
FIG. 20 is a second half of the flowchart showing the example of the initialization processing for on-demand data acquisition according to the third embodiment of the invention.

FIGS. 19 and 20 show examples of flowcharts that describe in detail the on-demand data acquisition initialization processing according to the third embodiment. The flow of this processing is similar to that in FIG. 15 of the second embodiment, but steps S1901 and S2001 are different.

First, the blockchain program 300 of the new server 220-2 transmits, in addition to the value of the latest block number of the block data 700 held by the blockchain program 300 of the new server 220-2 itself and the value of the on-demand data acquisition source C1710 of the running mode flag information 1700, the commit synchronization start request to the blockchain programs 300 of the all existing servers 220 specified by the on-demand data acquisition source C1710 of the running mode flag information 1700 (S1901).

The subsequent processing is similar to that in FIG. 15 of the second embodiment, but the blockchain program 300 of the existing server 220-1 not only sets the commit synchronization mode flag in step S2001, but also writes the value of the on-demand data acquisition source C1710 of the running mode flag information 1700 transmitted by the new server 220-2 in the step S1901 into the commit synchronization target C1720 of the running mode flag information 1700.

As a result, in the commit synchronization processing of the block commit processing, the block data determination request is transmitted synchronously to all of the plurality of servers 220, and the blockchain data 290 is synchronized between the server 220 that executes the commit processing and the server 220 set in the commit synchronization target C1720 of the running mode flag information 1700. The subsequent processing is the same as that in FIG. 15 of the second embodiment.

Figure 21:
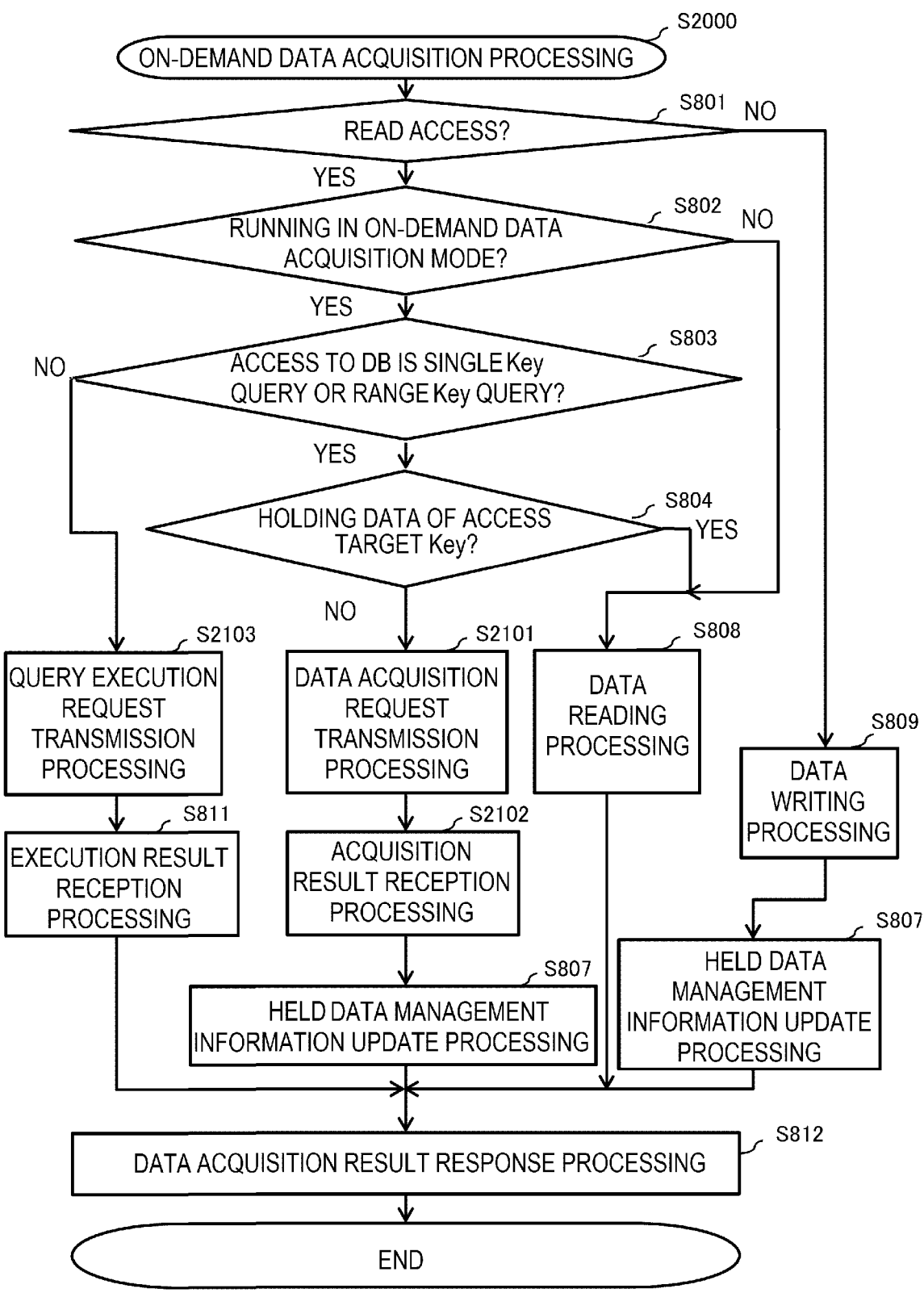
FIG. 21 is a flowchart showing an example of on-demand data acquisition processing according to the third embodiment of the invention.

FIG. 21 shows an example of a flow that describes the on-demand data processing in detail according to the third embodiment. The flow of the processing is similar to that in FIG. 8 of the first embodiment, but steps S2101 to S2103 are different from those of the first embodiment.

In step S2101, the on-demand data acquisition module 340 acquires data on demand from the existing server 220-1. At this time, for example, the on-demand data acquisition module 340 selects one server 220 from the server information of the on-demand data acquisition source C1710 of the running mode flag information 1700 by random or round robin, and transmits a data acquisition request to the selected server 220.

Alternatively, when the interface type C520 used to access the database 285 is the range Key query, the on-demand data acquisition module 340 may equally divide the range acquired by the range Key query, and transmit the data acquisition request to all of the servers 220 specified by the on-demand data acquisition source C1710 of the running mode flag information 1700.

Then, in step S2102, the on-demand data acquisition module 340 waits for a response from all the servers 220, and integrates the acquisition results of the block data 700. Also in step S2103, the on-demand data acquisition module 340 selects one server 220 by random or round robin from, for example, the server information of the on-demand data acquisition source C1710 of the running mode flag information 1700, and transmits a data acquisition request to the selected server 220.

As described above, according to the third embodiment, the server 220-2 newly added to the blockchain system acquires the blockchain data 290 from the existing server 220 on demand by the on-demand data acquisition module 340 in the blockchain program 300 instead of acquiring all the data in advance. At this time, since a plurality of servers 220 which are on-demand data acquisition sources can be set, loads do not concentrate on a specific server 220.

As described above, in the third embodiment, by registering the information of the plurality of servers 220 in the on-demand data acquisition source C1710, at the time of on-demand data acquisition, the acquisition processing of the block data 700 can be executed at the same time from the plurality of servers, or the plurality of servers 220 can be switched in round robin (continuous) to execute the acquisition processing of the block data 700.

SUMMARY

The invention is not limited to the above embodiments, and includes various modifications. For example, the embodiments described above are detailed for easy understanding but the invention is not necessarily limited to including all the above configurations. In addition, a part of the configuration of a certain embodiment may be replaced with the configuration of another embodiment, and the configuration of a certain embodiment may be modified by adding a configuration of another embodiment. A part of the configuration of each embodiment may be added, deleted, or replaced by that of a different configuration, and the addition, deletion, and the replacement may be applied alone or in combination.

In regard to each of the above configurations, functions, processing units, and processing methods, a part thereof or an entirety thereof may be achieved by hardware, for example, by being designed as an integrated circuit. Further, each of the above configurations, functions, and the like may be achieved by software control that interprets and executes a program that achieves each function by a processor. Information such as the programs, tables, files, and the like for achieving the functions can be stored in a storage device such as a memory, a hard disk, an SSD or a storage medium such as an IC card, an SD card, a DVD, and the like.

Only control lines and information lines that are considered necessary for description are illustrated, and not all the control lines and information lines required for production are necessarily illustrated. It may be contemplated that in practice, almost all of the configurations are mutually connected.

What is claimed is:

1. A data management method which uses a plurality of servers each having a storage unit that stores data and a processing unit that runs on a processor and processes the data, and which processes processing target information distributed and stored in the storage units of the plurality of servers in response to a transaction request received by the plurality of servers, wherein the storage unit of the server stores first data including the processing target information and second data including transaction processing history information obtained by processing the processing target information based on the transaction request, the first data and the second data include a plurality of data associated with different transactions, the plurality of servers include a first server and a plurality of second servers, the plurality of second servers synchronize and hold the first data and the second data, the first server that has received the transaction request reads the first data related to the transaction request from the storage unit of at least one second server, processes the transaction request, replies a processing result to a request source of the transaction request, stores the second data including the transaction processing history information and the first data reflecting the processing result in an own server, and transmits the second data configured to reflect the processing in the first data of the at least one second server, the first server sets the at least one second server from which the first data is acquired as an on-demand data acquisition source server, the on-demand data acquisition source server sets the first server as a commit synchronization server, and transmits the second data reflecting updates of the first data to the first server, and in reading the first data, the first server searches the storage unit of an own server for the first data synchronized by the on-demand data acquisition source server, and acquires the first data from the storage unit of the on-demand data acquisition source server in a case where the first data is not acquired in the storage unit of the own server.

2. The data management method according to claim 1, wherein the first server is a newly added server.

3. The data management method according to claim 1, wherein in a case where a query related to the transaction request includes a first query specifying the first data, the first data is searched in the storage unit of the own server, and in a case where the query related to the transaction request includes a second query different from the first query, the first data is acquired from the storage unit of the on-demand data acquisition source server.

4. The data management method according to claim 1, wherein the first server sets the at least one second server from which the second data is acquired as a background data acquisition server and acquire the second data from the background data acquisition server, a transaction of the second data acquired from the on-demand data acquisition source server is later than a transaction related to the first data of the own server, and a transaction of the second data acquired from the background data acquisition server is earlier than the transaction related to the first data of the own server.

5. The data management method according to claim 4, wherein the first data is prepared based on the second data acquired from the background data acquisition server.

6. The data management method according to claim 5, wherein the second data is assigned with a block number, and the own server determines whether it is required to reflect the received second data to the first data based on the block number.

7. The data management method according to claim 1, wherein the second data includes a hash value indicating a relationship between the second data, the first server acquires the second data from the at least one second server before starting processing of the transaction request, and the first server prepares a prepared hash value based on transaction processing history information of the processing and the second data and transmits to the at least one second server after starting the processing.

8. The data management method according to claim 1, wherein the second data is assigned with a block number, the first server transmits the block number of second data to be held to the on-demand data acquisition source server, and the on-demand data acquisition source server selects second data based on the received block number and transmits the selected second data to the first server.

9. The data management method according to claim 1, wherein the first server sets the at least one second server from which the first data is acquired as an on-demand data acquisition source server, and the plurality of the second servers set the first server as a commit synchronization server, and transmits the second data reflecting updates of the first data to the first server.

10. A data management system which uses a plurality of servers each having a storage unit that stores data and a processing unit that runs on a processor and processes the data, and which processes processing target information distributed and stored in the storage units of the plurality of servers in response to a transaction request received by the plurality of servers, wherein the storage unit of the server stores first data including the processing target information and second data including transaction processing history information obtained by processing the processing target information based on the transaction request, the first data and the second data include a plurality of data associated with different transactions, the plurality of servers include a first server and a plurality of second servers, the plurality of second servers synchronize and hold the first data and the second data, the first server that has received the transaction request reads the first data related to the transaction request from the storage unit of at least one second server, processes the transaction request, replies a processing result to a request source of the transaction request, stores the second data including the transaction processing history information and the first data reflecting the processing result in an own server, and transmits the second data configured to reflect the processing in the first data of the at least one second server, the first server sets the at least one second server from which the first data is acquired as an on-demand data acquisition source server, the on-demand data acquisition source server sets the first server as a commit synchronization server, and transmits the second data reflecting updates of the first data to the first server, and in reading the first data, the first server searches the storage unit of an own server for the first data synchronized by the on-demand data acquisition source server, and acquires the first data from the storage unit of the on-demand data acquisition source server in a case where the first data is not acquired in the storage unit of the own server.

\* \* \* \* \*